United States Patent
Yasuda et al.

(10) Patent No.: US 7,277,365 B2
(45) Date of Patent: Oct. 2, 2007

(54) OPTICAL INFORMATION PROCESSING APPARATUS AND METHOD OF PROCESSING OPTICAL INFORMATION

(75) Inventors: Akihiro Yasuda, Katano (JP); Shin-ichi Kadowaki, Sanda (JP); Kousei Sano, Osaka (JP); Yuuichi Kuze, Settsu (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 637 days.

(21) Appl. No.: 10/289,685

(22) Filed: Nov. 6, 2002

(65) Prior Publication Data

US 2003/0107961 A1    Jun. 12, 2003

(30) Foreign Application Priority Data

Dec. 7, 2001 (JP) ............... 2001-373682

(51) Int. Cl.
*G11B 7/095* (2006.01)

(52) U.S. Cl. .................................. 369/44.27

(58) Field of Classification Search ............ 369/44.27, 369/53.34
See application file for complete search history.

(56) References Cited

U.S. PATENT DOCUMENTS

| | | | | |
|---|---|---|---|---|
| 5,559,785 | A * | 9/1996 | Honda et al. .............. | 369/59.2 |
| 5,627,808 | A * | 5/1997 | Hajjar et al. ............. | 369/44.32 |
| 5,848,036 | A * | 12/1998 | Ishibashi et al. ......... | 369/44.28 |
| 6,229,600 | B1 | 5/2001 | Martynov | |
| 6,324,133 | B1 | 11/2001 | Ichimura | |
| 6,442,119 | B1 * | 8/2002 | Sunagawa ................ | 369/47.53 |
| 6,628,582 | B2 | 9/2003 | Furukawa | |
| 6,798,731 | B1 | 9/2004 | Kim et al. | |
| 6,826,133 | B2 | 11/2004 | Ichimura et al. | |
| 6,934,226 | B2 * | 8/2005 | Yasuda et al. ........... | 369/44.29 |
| 6,970,405 | B2 * | 11/2005 | Tateishi et al. .......... | 369/44.32 |
| 2001/0021146 | A1 | 9/2001 | Kikuchi et al. | |
| 2001/0028614 | A1 * | 10/2001 | Furukawa ................ | 369/44.32 |
| 2001/0033541 | A1 | 10/2001 | Iwasaki et al. | |
| 2002/0089904 | A1 * | 7/2002 | Takeshira ................ | 369/44.23 |
| 2004/0136281 | A1 | 7/2004 | Yanagisawa et al. | |
| 2004/0174781 | A1 * | 9/2004 | Nishi ...................... | 369/44.32 |

FOREIGN PATENT DOCUMENTS

| | | |
|---|---|---|
| CN | 1303093 | 7/2001 |
| EP | 1 130 581 | 9/2001 |
| JP | 7-201059 | 8/1995 |

(Continued)

*Primary Examiner*—William Korzuch
*Assistant Examiner*—Nathan Danielsen
(74) *Attorney, Agent, or Firm*—Hamre, Schumann, Mueller & Larson, P.C.

(57) ABSTRACT

An optical information processing apparatus includes: an optical head for irradiating an optical information recording medium with light, converting the light reflected by the optical information recording medium into a head signal and outputting the head signal; a signal quality index detector for detecting a signal quality index representing quality of the head signal on the basis of the head signal; and a two-dimensional probe for varying the focal position and the spherical aberration of the light radiated onto the optical information recording medium so as to search for a focal position and a spherical aberration that optimize the signal quality index detected by the signal quality index detector.

2 Claims, 17 Drawing Sheets

FOREIGN PATENT DOCUMENTS

| | | |
|---|---|---|
| JP | 9-134538 | 5/1997 |
| JP | 9-312025 | 12/1997 |
| JP | 10-69657 | 3/1998 |
| JP | 10-106012 | 4/1998 |
| JP | 2000-11388 | 1/2000 |
| JP | 2000-40237 | 2/2000 |
| JP | 2000-57615 | 2/2000 |
| JP | 2000-285485 | 10/2000 |
| JP | 2001-222838 | 8/2001 |
| JP | 2002-324328 | 11/2002 |
| JP | 2002-342952 | 11/2002 |
| JP | 2004095106 A * | 3/2004 |
| WO | 00/39792 | 7/2000 |
| WO | 2002/073610 | 9/2002 |

* cited by examiner

OPTICAL INFORMATION PROCESSING APPARATUS AND METHOD OF PROCESSING OPTICAL INFORMATION

BACKGROUND OF THE INVENTION

1. Field of the Invention

The present invention relates to an optical information processing apparatus with an optical head for irradiating an optical information recording medium with light, converting the light reflected by the optical information recording medium into a head signal, and outputting the head signal. The present invention relates also to a method of processing optical information.

2. Description of the Related Art

Optical discs called DVDs (Digital Versatile Disks) are commercially available as optical information recording media of high density and high capacity. Such optical discs have been used widely these days for recording media to record images, music, and computer data. Studies on optical discs for the next generation, i.e., optical discs having further improved recording density, have proceeded in many facilities. Such next-generation optical discs are expected as recording media for replacing videotapes used for the currently-dominating VTRs (Video Tape Recorders), and the development is pursued at a feverish pitch.

An available technique for improving the recording density of an optical disc is to reduce the spot formed on a recording surface of an optical disc. Such a spot can be reduced by increasing the numerical aperture of light radiated from the optical head and decreasing the wavelength of the light.

However, a spherical aberration caused by an error in thickness of a protective layer formed on the optical disc will be increased rapidly when the numerical aperture of light radiated from the optical head is increased and the wavelength of the light is decreased. Therefore, a means for compensating the spherical aberration is required. The following description is about a conventional optical information processing apparatus having a means for compensating the spherical aberration.

FIG. 15 is a block diagram showing a configuration of a conventional optical information processing apparatus 90, and FIG. 16 is a block diagram for explaining a configuration of an optical head 5 provided in the conventional optical information processing apparatus 90. The optical head 5 in the optical information processing apparatus 90 has a semiconductor laser 123. A light beam 122 emitted from the semiconductor laser 123 passes through a prism 124, and it is collimated by a focusing lens 13 so as to be a substantially parallel light beam.

The light beam collimated by the focusing lens 13 passes through a concave lens and a convex lens provided in a spherical aberration compensator 7 and the light beam is reflected by a mirror 14. The light beam reflected by the mirror 14 is converged by an object lens 9 so as to form a spot on a recording surface formed on an optical disc 6, and reflected by the recording surface so as to form reflected light 33. The reflected light 33 passes again through the objective lens 9, and it is reflected by the mirror 14. Then, the light passes through the spherical aberration compensator 7, and it is focused by the focusing lens 13. After being focused by the focusing lens 13, the light 33 is reflected by a prism 124, and it passes through a hologram 115 provided for detecting a spherical aberration and also a cylindrical lens 116 provided for detecting a focal position so as to enter a photodetector 117.

The photodetector 117 generates a head signal on the basis of the reflected light 33 as incident light, and outputs the head signal into a preamp 18. The preamp 18 generates and outputs a focusing error signal FE according to astigmatism on the basis of the head signal outputted from the photodetector 117 provided in the optical head 5. Moreover, as disclosed in Tokuhyo-2001-507463 (published Japanese translation of PCT international publication for patent application), the preamp 18 detects separately a focusing error signal at the inner radius of the reflected light 33 and that of the rim of the reflected light 33, and generates a spherical aberration error signal SAE on the basis of the difference between the focusing error signals and outputs spherical aberration error signal SAE.

The focusing error signal FE outputted from the preamp 18 is inputted into a signal-amplitude instrument 20 via a switch 28. The signal-amplitude instrument 20 measures an amplitude of the focusing error signal FE and outputs the measurement result as a detection signal $FE_{pp}$ into an amplitude-maximum probe 21. The amplitude-maximum probe 21 outputs a spherical aberration compensating signal $\Delta SAE$ into an adder 26 so that the detection signal $FE_{pp}$ has a maximum amplitude.

The amplitude-maximum probe 21 searches for the spherical aberration, using the detection signal $FE_{pp}$ as the evaluation value so as to obtain a maximum detection signal $FE_{pp}$. An example of the methods for searching for an optimum spherical aberration as described above includes varying the spherical aberration compensating signal $\Delta SAE$ slightly in order to slightly fluctuate the spherical aberration, checking a fluctuation of the amplitude of the detection signal $FE_{pp}$ at that time, and varying the spherical aberration compensating signal $\Delta SAE$ for increasing the detection signal $FE_{pp}$.

Since a switch 27 is in an OFF-state, the adder 26 outputs the spherical aberration compensating signal $\Delta SAE$ from the amplitude-maximum probe 21 into a spherical aberration controller 12. The spherical aberration controller 12 outputs a control signal into a spherical aberration compensating actuator 8 provided in the spherical aberration compensator 7 of the optical head 5, on the basis of the spherical aberration compensating signal $\Delta SAE$ outputted from the adder 26, in order to vary a divergence of the light beam by varying spacing between two lenses provided in the spherical aberration compensator 7 and compensate the spherical aberration caused by an error in thickness of a protective layer formed on the optical disc 6.

The preamp 18 generates a reproduction signal RF by amplifying the head signal outputted from the optical head 5, and outputs the reproduction signal RF into a jitter detector 4. The jitter detector 4 measures jitter of the reproduction signal RF outputted from the preamp 18, and outputs the measurement result as a jitter detection signal JT into a minimum-jitter probe 91.

Here, the term 'jitter' denotes a physical quantity representing a time delay of an information transition for a reproduction signal. The jitter has a close relationship with an error rate representing the probability of error occurrence at the time of reading information from the optical disc. Therefore, the jitter is used as an evaluation value for controlling in the optical information processing apparatus.

The minimum-jitter probe 91 searches for a focal position having a minimum jitter value by using a technique similar to the above-described case where the amplitude-maximum probe 21 is used, and outputs a focal position compensating signal $\Delta FE$ into the adder 25. The switch 28 is turned to the adder 25, and the focusing error signal FE from the preamp 18 is outputted into the adder 25. The adder 25 performs addition of the focusing error signal FE outputted from the preamp 18 and the focal position compensating signal ΔFE outputted from the minimum-jitter probe 91, and outputs the result into the focusing controller 11. On the basis of the result of addition outputted from the adder 25, the focusing controller 11 outputs a control signal into a focusing actuator 10 provided in the optical head 5. On the basis of the control signal outputted from the focusing controller 11, the focusing actuator 10 drives the objective lens 9 along with a direction perpendicular to the optical disc 6 in order to control the focal position of the light beam converged on the optical disc 6. Accordingly, a focus control is performed.

Then, the switch 27 is turned from an OFF-state to an ON-state. Into the adder 26, the amplitude-maximum probe 21 outputs the spherical aberration compensating signal ΔSAE that maximizes the amplitude of the focusing error signal FE stored in advance of the performance of the focus control. The adder 26 performs addition of the spherical aberration SAE outputted from the preamp 18 and the spherical aberration compensating signal ΔSAE outputted from the amplitude-maximum probe 21 and outputs the result into the spherical aberration controller 12. On the basis of the addition result outputted from the adder 26, the spherical aberration controller 12 outputs the control signal into the spherical aberration compensating actuator 8 provided in the spherical aberration compensator 7 of the optical head 5. The spherical aberration compensating actuator 8, on the basis of the control signal outputted from the spherical aberration controller 12, varies spacing between two lenses provided in the spherical aberration compensator 7 and varies the divergence of the light beam in order to compensate the spherical aberration caused by an error in thickness of the protective layer formed on the optical disc 6.

In this manner, an optical disc apparatus according to the conventional technique compensates the spherical aberration first, and then searches for a focal position that minimizes the jitter value.

However, a recent study by the inventors clarified that the jitter may not be converged to its minimum value in the thus configured optical information processing apparatus.

FIGS. 17A–17C are graphs showing the relationship between a wave front aberration and a distance from a center of a light beam. The x-axis in each graph indicates a distance from a center of a light beam radiated from the optical head 5 onto the optical disc 6, and the y-axis indicates a wave front aberration. The wave front aberration is used for evaluating optical characteristics of the optical head since it has a close relationship with jitter.

FIG. 17A shows a relationship between a wave front aberration and a distance from a center of a light beam, where the light beam has a focal position at a location displaced by some degree from the recording surface formed on the optical disc along with a direction perpendicular to the surface of the optical disc. As shown in FIG. 17A, a curve indicating a relationship between the wave front aberration and a distance from a center of a light beam makes a quadratic curve in the case that the focal position of the light beam is displaced from the recording surface.

FIG. 17B shows a relationship between a wave front aberration and a distance from a center of a light beam when a spherical aberration is provided by 20 mλ using the spherical aberration compensator 7 for a case that the focal position is displaced as shown in FIG. 17A. As clearly indicated by the curve in FIG. 17B, the total wave front aberration is increased in a comparison with the total wave front aberration shown in FIG. 17A.

FIG. 17C shows a relationship between a wave front aberration and a distance from a center of a light beam when a spherical aberration is provided by −20 mλ using the spherical aberration compensator 7 in a case that the focal position is displaced as shown in FIG. 17A. As clearly indicated by the curve in FIG. 17C, the total wave front aberration is decreased in comparison with the total wave front aberration shown in FIG. 17A.

As described above, a total wave front aberration is increased for the case of FIG. 17B while it is decreased for the case of FIG. 17C even when providing spherical aberrations that are identical in the absolute value. This indicates that the focal position and the spherical aberration are influenced by each other, and that the focal position and the spherical aberration are under an influence of jitter.

In the above-described conventional optical information processing apparatus, the spherical aberration and the focal position are searched separately, for example, by searching for a spherical aberration that maximizes an amplitude of a focusing error signal and then searching for a focal position that minimizes a jitter value.

However, as described above, both the focal position and the spherical aberration influence jitter. Therefore, when the focal position and the spherical aberration are searched separately, a convergence result in the searches may vary depending on the initial focal position and the initial spherical aberration. This may result in failures in obtaining a result in a search to find a true minimum value of the jitter. When a searched jitter value is shifted from the true minimum value, reproduction signals will deteriorate. Moreover, either record information or address information recorded on the optical disc may not be read normally. Furthermore, information may not be recorded accurately since recording on the optical disc is carried out in a state that the spot of the light beam is spread.

The present invention aims to solve the above-described problems, and the object is to provide an optical information processing apparatus for obtaining a high quality signal reproduced from an optical disc, and a method of processing optical information.

SUMMARY OF THE INVENTION

For achieving the above-described objects, an optical information processing apparatus according to the present invention includes: an optical head for irradiating an optical information recording medium with light, converting the light into a head signal and outputting the head signal; a signal quality index detector for detecting a signal quality index representing quality of the head signal on the basis of the head signal outputted from the optical head; and a two-dimensional probe for varying the focal position and the spherical aberration of the radiated light so as to search for a focal position and a spherical aberration that optimize the signal quality index.

In the present specification, the term 'signal quality index' is an index representing the quality of a head signal converted using the optical head from light that is reflected by the optical information recording medium. The signal quality index includes, for example, jitter, an error rate, an amplitude of a reproduction signal, an amplitude of a tracking error signal, an amplitude of a focusing error signal, and an amplitude of a wobble signal.

A method of processing optical information according to the present invention includes: a step of irradiating an optical information recording medium with light, converting the light reflected by the optical information recording medium into a head signal, and outputting the head signal; a step of detecting a signal quality index representing the quality of the head signal on the basis of the head signal; and a step of varying the focal position and the spherical aberration of the radiated light so as to search for a focal position and a spherical aberration that optimize the signal quality index.

DETAILED DESCRIPTION OF THE INVENTION

Figure 1:
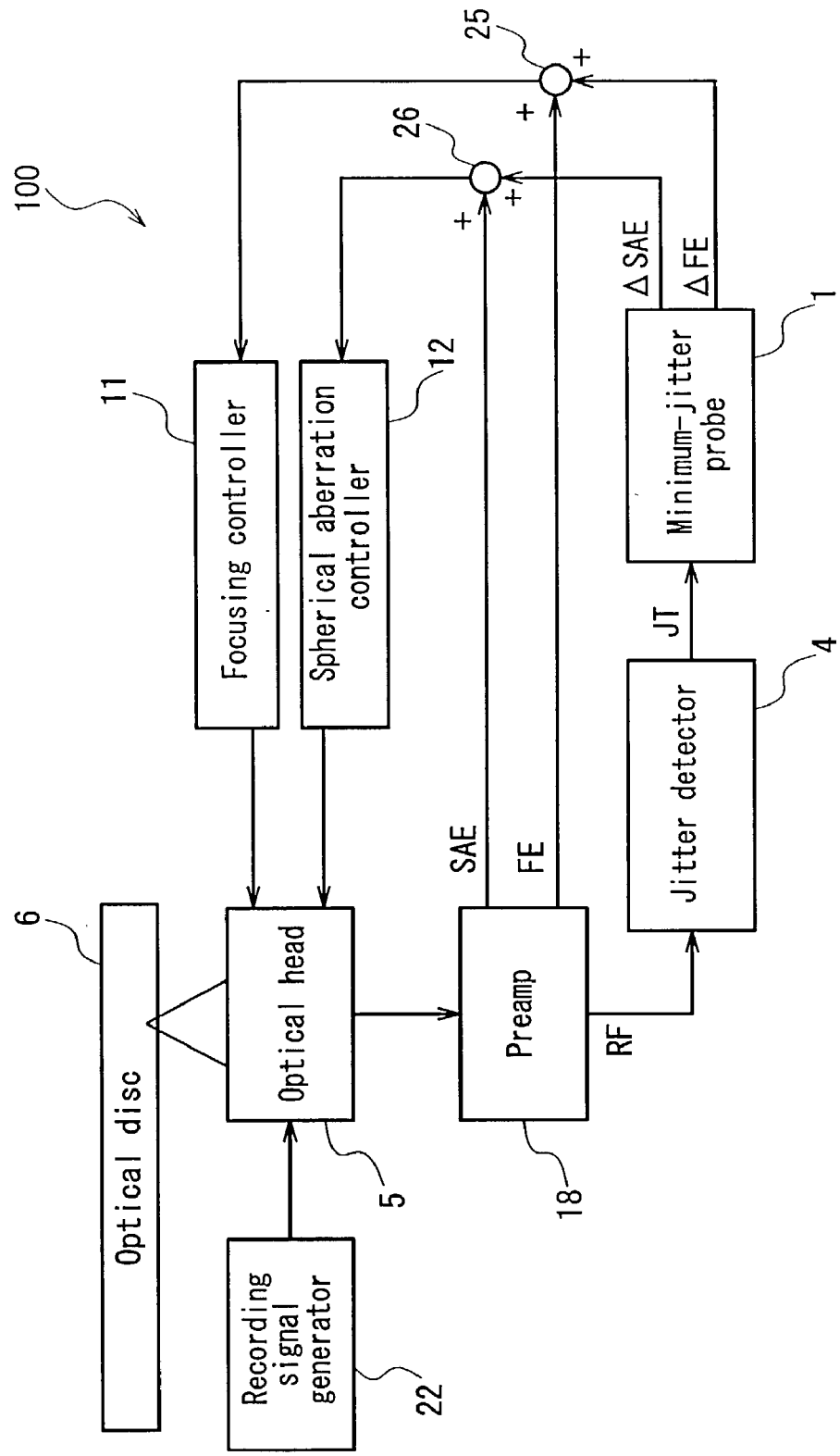
FIG. 1 is a block diagram showing a configuration of an optical information processing apparatus according to an embodiment of the present invention.

In an optical information processing apparatus according to an embodiment of the present invention, a focal position and a spherical aberration of light radiated onto an optical information recording medium are varied so that a two-dimensional probe searches for a focal position and a spherical aberration that optimize a signal quality index detected by a signal quality index detector. Accordingly, the value of the signal quality index can be optimized on the basis of the spherical aberration of the light radiated onto the optical information recording medium as well as on the basis of the focal position of the same light. As a result, the present invention provides an optical information processing apparatus that can optimize the quality of a head signal outputted from the optical head.

It is preferable that the two-dimensional probe includes a focal position probe for varying the focal position so as to search for a focal position that optimizes the value of the signal quality index and also a spherical aberration probe for varying the spherical aberration so as to search for a spherical aberration that optimizes the value of the signal quality index.

It is preferable that the two-dimensional probe searches for a focal position and a spherical aberration that optimize the value of the signal quality index by alternately repeating the search for the focal position by using the focal position probe and the search for the spherical aberration by using the spherical aberration probe.

It is preferable that the two-dimensional probe compares values of the signal quality indices at respective points (Xi, Yj) so as to search for a point (Xa, Yb) that optimizes the signal quality index, and repeats the search around the point (Xa, Yb) while reducing a range ΔX and a range ΔY so as to obtain a focal position and a spherical aberration that optimize the signal quality index. The focal position is defined as a variable X and the spherical aberration is defined as a variable Y, a value of n ('n' is an integer bigger than 1) of the variable X within a range ΔX is denoted as Xi ('i' is 1 or an integer bigger than 1 and not bigger than n), and a value of m ('m' is an integer bigger than 1) of the variable Y within a range ΔY is denoted as Yj ('j' is 1 or an integer bigger than 1 and not bigger than m).

It is preferable that, when the focal position is defined as a variable X and the spherical aberration is defined as a variable Y, the two-dimensional probe varies the focal position X at a predetermined spherical aberration Y1 so as to search for a focal position X1 that optimizes the signal quality index and varies the focal position X at a predetermined spherical aberration Y2 so as to search for a focal position X2 that optimizes the signal quality index, and the two-dimensional probe varies the focal position X and the spherical aberration Y on a straight line Y=(Y2−Y1)/(X2−X1)×(X−X1)+Y1 that connects a point (X1, Y1) and a point (X2, Y2) so as to search for a focal position and a spherical aberration that optimize the signal quality index.

It is preferable that, when the focal position is defined as a variable X and the spherical aberration is defined as a variable Y, the two-dimensional probe varies the spherical aberration Y at a predetermined focal position X1 so as to search for a spherical aberration Y1 that optimizes the signal quality index and varies the spherical aberration Y at a predetermined focal position X2 so as to search for a spherical aberration Y2 that optimizes the signal quality index, and the two-dimensional probe varies the focal position X and the spherical aberration Y on a straight line $Y=(Y2-Y1)/(X2-X1)\times(X-X1)+Y1$ that connects a point (X1, Y1) and a point (X2, Y2) so as to search for a focal position and a spherical aberration that optimize the signal quality index.

It is preferable that, when the focal position is defined as a variable X and the spherical aberration is defined as a variable Y, the two-dimensional probe varies the focal position X and the spherical aberration Y on a straight line $Y=aX+Y0$ concerning a tilt a passing a predetermined spherical aberration Y0 so as to search for a focal position X1 and a spherical aberration Y1 that optimize the signal quality index value, and the two-dimensional probe varies the focal position X and the spherical aberration Y on a straight line $Y=-(X-X1)/a+Y1$ concerning a tilt $-1/a$ passing a point (X1, Y1) so as to search for a focal position and a spherical aberration that optimize the signal quality index value.

It is preferable that $\lambda$ is 390 nm or more and 420 nm or less, NA is about 0.85, and the value of the tilt a is 0.1 $\lambda$rms/$\mu$m or more and 0.3 $\lambda$rms/$\mu$m or less, when $\lambda$ denotes a wavelength of the light radiated onto the optical information recording medium and NA denotes a numerical aperture.

It is preferable that the signal quality index detected by the signal quality index detector is jitter and that the two-dimensional probe searches for a focal position and a spherical aberration that minimize the jitter.

It is preferable that the signal quality index detected by the signal quality index detector is an error rate and that the two-dimensional probe searches for a focal position and a spherical aberration that minimize the error rate.

It is preferable that the signal quality index detected by the signal quality index detector is an amplitude of a reproduction signal and that the two-dimensional probe searches for a focal position and a spherical aberration that maximize the amplitude of the reproduction signal.

It is preferable that the signal quality index detected by the signal quality index detector is an amplitude of a tracking error signal and that the two-dimensional probe searches for a focal position and a spherical aberration that maximize the amplitude of the tracking error signal.

It is preferable that the signal quality index detected by the signal quality index detector is an amplitude of a wobble signal and that the two-dimensional probe searches for a focal position and a spherical aberration that maximize the amplitude of the wobble signal.

It is preferable that experimental information is recorded on the optical information recording medium and that the head signal converted from the light reflected by the optical information recording medium is obtained by reproducing the experimental information.

It is preferable that the signal quality index comprises a focusing error signal and a tracking error signal; the two-dimensional probe has a focal position probe for varying the focal position so as to search for a focal position that maximizes the amplitude of the tracking error signal, and a spherical aberration probe for varying the spherical aberration so as to search for a spherical aberration that maximizes the amplitude of the focusing error signal; and the optical head records the experimental information on the optical information recording medium at a spherical aberration that maximizes the amplitude of the focusing error signal and at a focal position that maximizes the amplitude of the tracking error signal.

A method of processing optical information according to an embodiment of the present invention includes a two-dimensional search step of varying a focal position and a spherical aberration of light radiated onto an optical information recording medium so as to search for a focal position and a spherical aberration that optimize a signal quality index detected in a step of detecting signal quality index. Thereby, the signal quality index can be optimized on the basis of a focal position of light radiated onto an optical information recording medium and also on the basis of a spherical aberration of the light radiated onto the optical information recording medium. As a result, the method according to the present invention can optimize the quality of a head signal output from an optical head.

It is preferable that the two-dimensional search comprises: a focal position search comprising varying the focal position so as to search for a focal position that optimizes the signal quality index, and a spherical aberration search comprising varying the spherical aberration so as to search for a spherical aberration that optimizes the signal quality index.

It is preferable that the two-dimensional search comprises alternate repetition of a search for the focal position by using the focal position probe and a search for the spherical aberration by using the spherical aberration probe so as to search for a focal position and a spherical aberration that optimize the signal quality index.

It is preferable in the two-dimensional search that the signal quality indices at the respective points (Xi, Yj) are compared so as to search for a point (Xa, Yb) that optimizes the signal quality index and the search around the point (Xa, Yb) is repeated while reducing a range $\Delta X$ and a range $\Delta Y$ so as to obtain a focal position and a spherical aberration that optimize the signal quality index. The focal position is defined as a variable X and the spherical aberration is defined as a variable Y, a value of n ('n' is an integer bigger than 1) of the variable X within a range $\Delta X$ is denoted as Xi ('i' is 1 or an integer bigger than 1 and not bigger than n), and a value of m ('m' is an integer bigger than 1) of the variable Y within a range $\Delta Y$ is denoted as Yj ('j' is 1 or an integer bigger than 1 and not bigger than m).

It is preferable in the two-dimensional search that, when the focal position is defined as a variable X and the spherical aberration is defined as a variable Y, the focal position X is varied at a predetermined spherical aberration Y1 so as to search for a focal position X1 that optimizes the signal quality index, and the focal position X is varied at a predetermined spherical aberration Y2 so as to search for a focal position X2 that optimizes the signal quality index, and the focal position X and the spherical aberration Y are varied on a straight line $Y=(Y2-Y1)/(X2-X1)\times(X-X1)+Y1$ that connects a point (X1, Y1) and a point (X2, Y2) so as to search for a focal position and a spherical aberration that optimize the signal quality index.

It is preferable in the two-dimensional search that, when the focal position is defined as a variable X and the spherical aberration is defined as a variable Y, the spherical aberration Y is varied at a predetermined focal position X1 so as to search for a spherical aberration Y1 that optimizes the signal quality index, and the spherical aberration Y is varied at a predetermined focal position X2 so as to search for a spherical aberration Y2 that optimizes the signal quality index, and the focal position X and the spherical aberration Y are varied on a straight line $Y=(Y2-Y1)/(X2-X1)\times(X-$ X1)+Y1 that connects a point (X1, Y1) and a point (X2, Y2) so as to search for a focal position and a spherical aberration that optimize the signal quality index.

It is preferable in the two-dimensional search that, when the focal position is defined as a variable X and the spherical aberration is defined as a variable Y, the focal position X and the spherical aberration Y are varied on a straight line Y=aX+Y0 concerning a tilt a passing a predetermined spherical aberration Y0 so as to search for a focal position X1 and a spherical aberration Y1 that optimize the signal quality index, and that the focal position X and the spherical aberration Y are varied on a straight line Y=−(X−X1)/a+Y1 concerning a tilt −1/a passing a point (X1, Y1) so as to search for a focal position and a spherical aberration that optimize the signal quality index.

It is preferable that λ is 390 nm or more and 420 nm or less, NA is about 0.85, and the value of the tilt a is 0.1 λrms/μm or more and 0.3 μrms/μm or less, when λ denotes a wavelength of the light radiated onto the optical information recording medium and NA denotes a numerical aperture.

It is preferable in the two-dimensional search that the signal quality index detected by the signal quality index detector is jitter and that a focal position and a spherical aberration that minimize the jitter are searched for.

It is preferable in the two-dimensional search that the signal quality index detected by the signal quality index detector is an error rate and that a focal position and a spherical aberration that minimize the error rate are searched for.

It is preferable in the two-dimensional search that the signal quality index detected by the signal quality index detector is an amplitude of a reproduction signal and that a focal position and a spherical aberration that maximize the amplitude of the reproduction signal are searched for.

It is preferable in the two-dimensional search that the signal quality index detected by the signal quality index detector is an amplitude of a tracking error signal and that a focal position and a spherical aberration that maximize the amplitude of the tracking error signal are searched for.

It is preferable in the two-dimensional search that the signal quality index detected by the signal quality index detector is an amplitude of a wobble signal and that a focal position and a spherical aberration that maximize the value of amplitude of the wobble signal are searched for.

It is preferable that experimental information is recorded on the optical information recording medium and that the head signal converted from the light reflected by the optical information recording medium is obtained by reproducing the experimental information.

It is preferable that the signal quality index comprises a focusing error signal and a tracking error signal; the two-dimensional search includes varying the focal position so as to search for a focal position that maximizes the amplitude of the tracking error signal, and a spherical aberration detection includes varying the spherical aberration so as to search for a spherical aberration that maximizes the amplitude of the focusing error signal; and the optical head signal output includes recording of the experimental information on the optical information recording medium at a spherical aberration that maximizes the amplitude of the focusing error signal and at a focal position that maximizes the amplitude of the tracking error signal.

Embodiments of the present invention will be described below by referring to the attached drawings.

Figure 2:
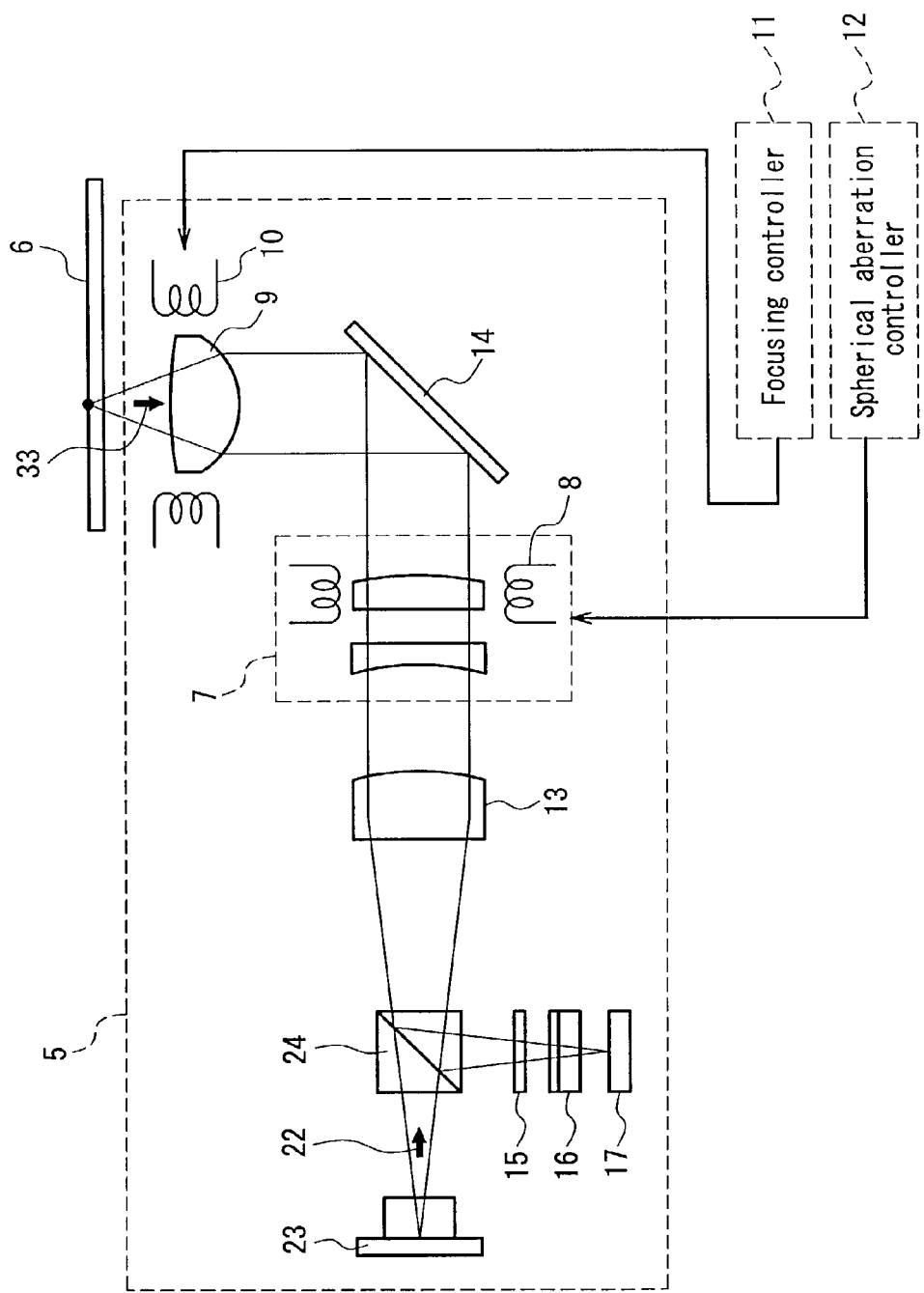
FIG. 2 is a block diagram for explaining the configuration of an optical head provided in an optical information processing apparatus according to an embodiment of the present invention.
Figure 3:
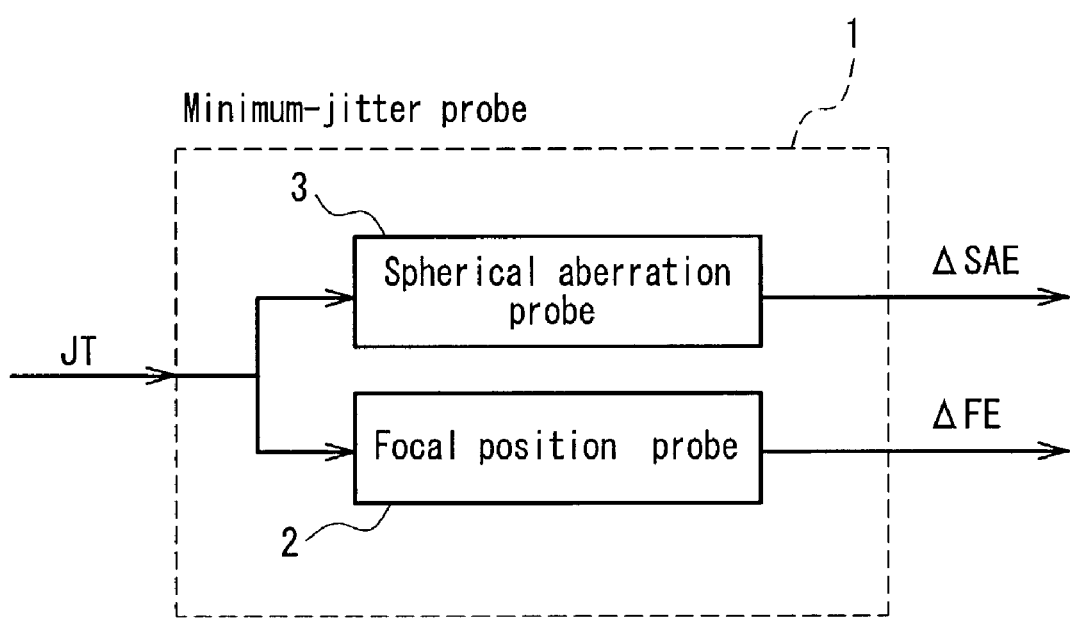
FIG. 3 is a block diagram showing the configuration of a minimum jitter probe provided in an optical information processing apparatus according to an embodiment of the present invention.

FIG. 1 is a block diagram showing a configuration of an optical information processing apparatus 100 according to an embodiment, and FIG. 2 is a block diagram for explaining a configuration of an optical head 5 provided in the optical information processing apparatus 100. FIG. 3 is a block diagram showing a configuration of a minimum-jitter probe 1 provided in the optical information processing apparatus 100.

The optical head 5 in the optical information processing apparatus 100 has a semiconductor laser 23. A light beam 22 emitted from the semiconductor laser 23 passes through a prism 24, and it is collimated by a focusing lens 13 so as to be a substantially parallel light beam.

The light beam collimated by the focusing lens 13 passes through a concave lens and a convex lens provided in a spherical aberration compensator 7, and it is reflected by a mirror 14. The light beam reflected by the mirror 14 is converged by an objective lens 9 so as to form a spot on a recording surface formed on an optical disc 6, and reflected by the recording surface. The light reflected by the recording surface, i.e., reflected light 33, passes through the objective lens 9 again. After being reflected by the mirror 14, the reflected light 33 passes through the spherical aberration compensator 7, and it is focused by the focusing lens 13. The reflected light 33 focused by the focusing lens 13 is reflected by the prism 24. Then, the reflected light 33 enters a photodetector 17, after passing through a hologram 15 provided for detecting a spherical aberration and a cylindrical lens 16 provided for detecting a focal position.

The photodetector 17 generates a head signal on the basis of the incident reflected light 33 and outputs the head signal into a preamp 18. The preamp 18 generates a focusing error signal FE according to astigmatism on the basis of a head signal outputted from the photodetector 17 provided in the optical head 5, and outputs the focusing error signal FE into an adder 25. The preamp 18 detects also the focusing error signals of the reflected light 33 at the inner radius and at the rim separately, generates a spherical aberration error signal SAE on the basis of a difference between the signals, and outputs the spherical aberration error signal SAE into an adder 26. Furthermore, the preamp 18 generates a reproduction signal RF by amplifying the head signal outputted from the optical head 5, and outputs the reproduction signal RF into a jitter detector 4. The jitter detector 4 measures jitter of the reproduction signal RF and outputs the result as a jitter detection signal JT into the minimum jitter probe 1.

Here, the term 'jitter' denotes a physical quantity representing a time delay of an information transition for a reproduction signal. The jitter has a close relationship with an error rate representing the probability of error occurrence at the time of reading information from the optical disc. Therefore, jitter is used as an evaluation value for control in the optical information processing apparatus.

The minimum jitter detector 1 has a focal position probe 2. The focal position probe 2 generates a focal position compensating signal ΔFE and outputs it into the adder 25, so that the focal position probe 2 varies the focal position so as to search for a focal position that minimize the value of the jitter detection signal JT.

The minimum jitter probe 1 has a spherical aberration probe 3. The spherical aberration probe 3 generates a spherical aberration compensating signal ΔSAE, so that it varies the spherical aberration so as to search for a spherical aberration that minimizes the value of the jitter detection signal JT.

The adder 25 performs an addition of the focusing error signal FE outputted from the preamp 18 and the focal position compensating signal ΔFE outputted from the focal position probe 2, and outputs the result into the focusing controller 11. The focusing controller 11 outputs a control signal into a focusing actuator 10 provided in the optical head 5, on the basis of the addition result outputted from the adder 25. The focusing actuator 10, on the basis of the control signal outputted from the focusing controller 11, drives the objective lens 9 along a direction perpendicular to the optical disc 6 so as to control the focal position of the light beam converged on the optical disc 6. Accordingly, focus control is carried out.

The adder 26 performs an addition of the spherical aberration error signal SAE outputted from the preamp 18 and the spherical aberration compensating signal ΔSAE outputted from the spherical aberration probe 3 and outputs the result into a spherical aberration controller 12. The spherical aberration controller 12, on the basis of the addition result outputted from the adder 26, outputs a control signal into a spherical aberration compensating actuator 8 provided in the spherical aberration compensator 7. The spherical aberration compensating actuator 8, on the basis of the control signal outputted from the spherical aberration controller 12, varies spacing between two lenses provided in the spherical aberration compensator 7 so that the divergence of the light beam is varied to compensate the spherical aberration occurring due to an error in thickness of a protective layer formed on the optical disc 6.

Figure 4:
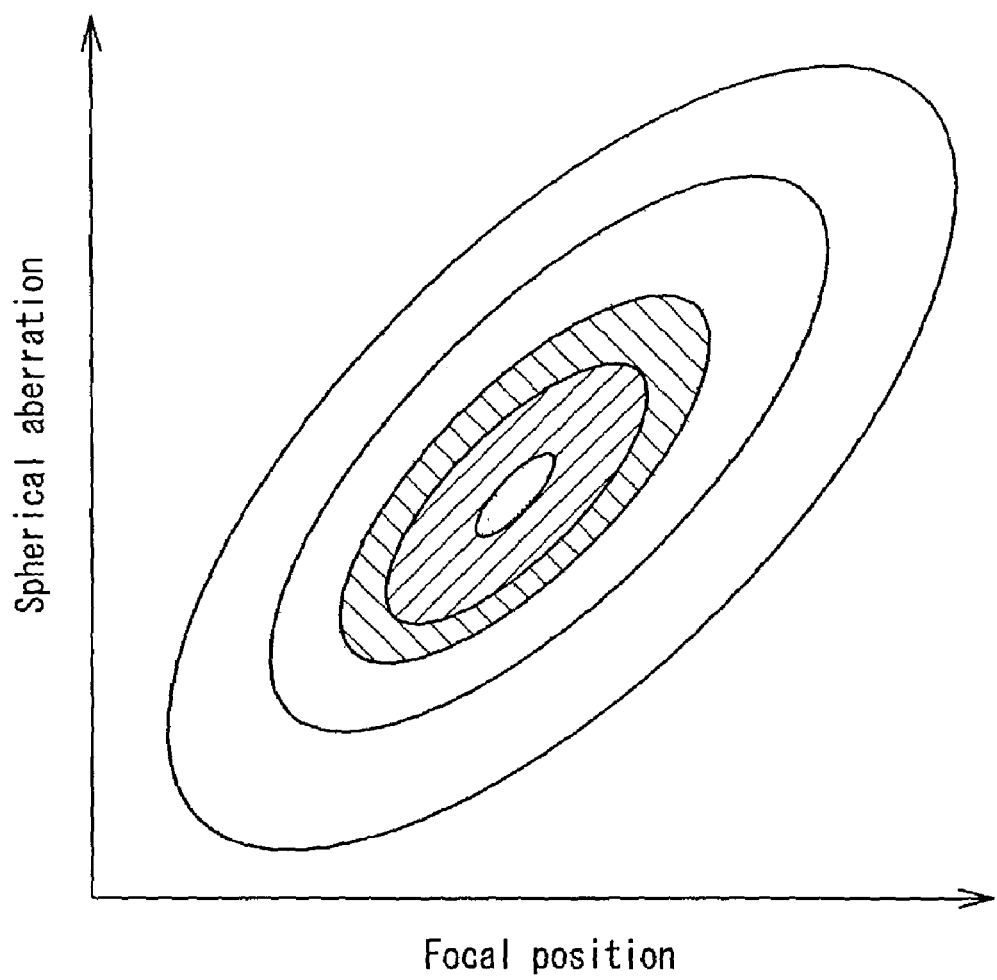
FIG. 4 is a graph showing a characteristic of jitter with respect to a focal position and a spherical aberration in an optical information processing apparatus according to an embodiment of the present invention.

FIG. 4 is a graph showing a jitter characteristic with respect to the focal position and the spherical aberration in the optical information processing apparatus 100. The x-axis denotes a focal position of a light beam radiated from the optical head 5 onto the optical disc 6, and the y-axis denotes a spherical aberration of the light beam on a recording surface formed on the optical disc 6. The jitter values are indicated with a contour map composed of ellipses drawn concentrically. The jitter values on the rims of the respective ellipses are equal, and the value is decreased with approach to the centers of the respective ellipses. Therefore, the jitter values are minimized at the centers of the respective ellipses.

As shown in FIG. 4, the major axes and the minor axes of the respective ellipses have tilts with respect to the x-axis and the y-axis. This indicates that the focal position and the spherical aberration are influenced by each other regarding the jitter. Therefore, it is undesirable to adjust the focal position and the spherical aberration separately from each other from a viewpoint of minimizing the jitter, but the adjustment should be carried out while relating them. That is, a two-dimensional search is required considering both the focal position and the spherical aberration in order to minimize the jitter value.

The minimum-jitter probe 1 performs such a two-dimensional search, and it is composed of, e.g., a microprocessor in the optical information processing apparatus 100 according to the embodiment of the present invention. When the minimum-jitter probe 1 is composed of a microprocessor, a two-dimensional search can be carried out easily by programming even if the method of the two-dimensional search is complicated to some degree.

Figure 5:
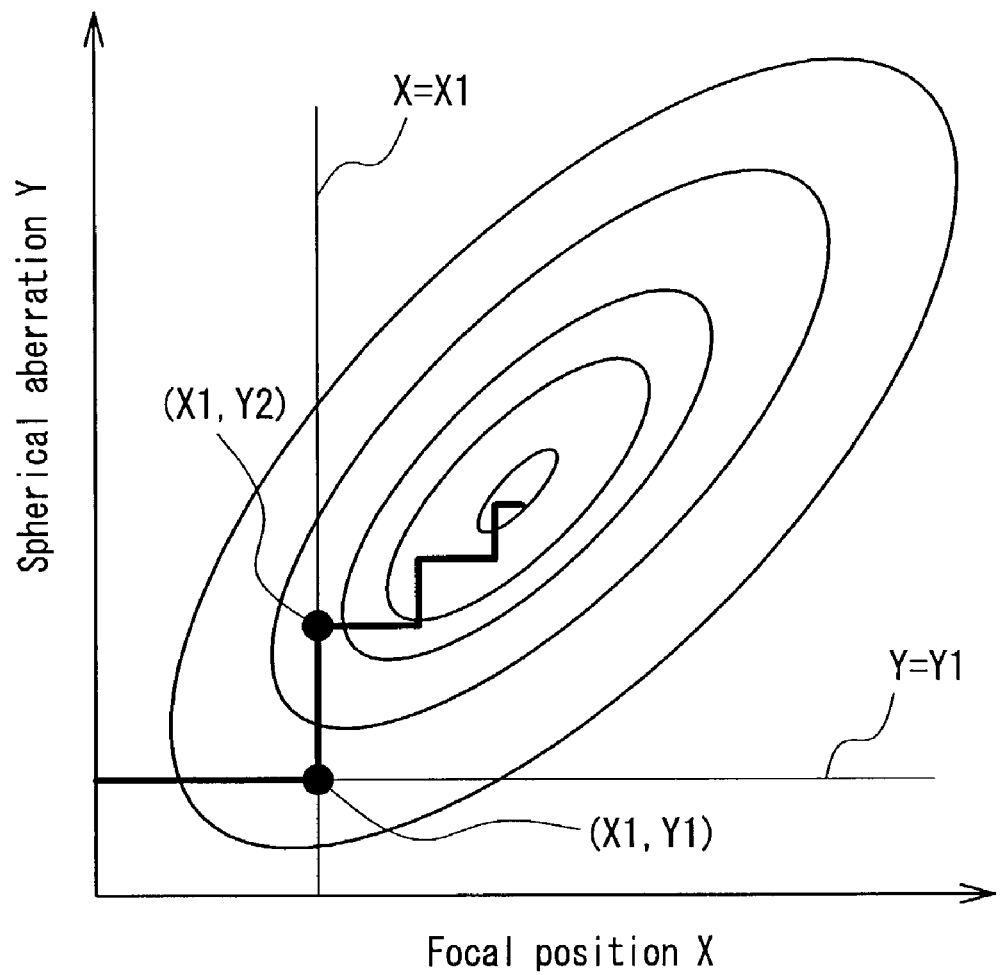
FIG. 5 is a graph for explaining a two-dimensional search using an optical information processing apparatus according to an embodiment of the present invention.

FIG. 5 is a graph for explaining a two-dimensional search using the optical information processing apparatus 100. Similar to the above-identified case concerning FIG. 4, the x-axis indicates a focal position and the y-axis indicates a spherical aberration. The jitter value is indicated with a contour map composed of ellipses drawn concentrically. Hereinafter, the focal point is indicated as X and the spherical aberration is indicated as Y for explanation.

First, the focal position probe 2 provided in the minimum-jitter probe 1 varies the focal position X on a straight line of a predetermined spherical aberration Y=Y1 so as to search for a focal position X1 that minimizes the jitter value. Then, the spherical aberration probe 3 varies the spherical aberration Y on a straight line of a predetermined focal position X=X1 so as to search for a spherical aberration Y2 that minimizes the jitter value. As a result of alternately repeated search for the focal position X by the focal position probe 2 and search for the spherical aberration Y by the spherical aberration probe 3, the jitter value is decreased as indicated by a zigzag line in FIG. 5. The repeated search is ended when the jitter value bottoms out and cannot be decreased by any of the search of the focal position X by using the focal position probe 2 or the search of spherical aberration Y by using the spherical aberration probe 3, thereby obtaining the focal position and the spherical aberration that minimize the jitter value.

Figure 6:
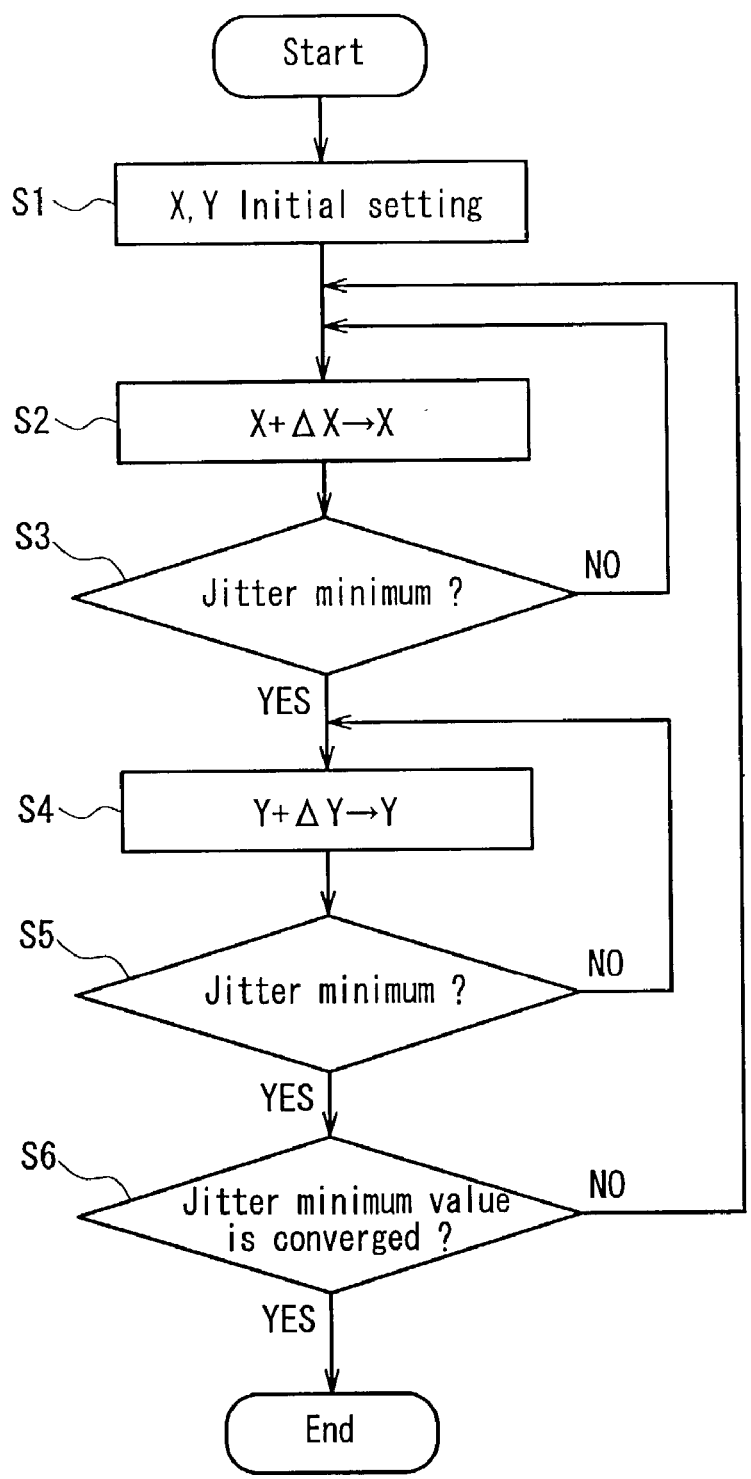
FIG. 6 is a flow chart showing an operation for a two-dimensional search using an optical information processing apparatus according to an embodiment of the present invention.

FIG. 6 is a flow chart showing an operation for the two-dimensional search by using the optical information processing apparatus 100. First in step S1, initial values of a focal position X and a spherical aberration Y are set. The initial values have a small jitter that is previously set by experiments, simulations or the like to be decreased to a level enabling signal reproduction. In step S2, the focal position probe 2 varies the focal position X by a degree of ΔX. Later, the jitter detector 4 measures the jitter. Next in step S3, the focal position probe 2 decides whether the measured jitter value is minimized or not. The operation returns to step S2 so as to vary the focal position X by using the focal position probe 2 until the jitter value is minimized. When the jitter is minimized (YES in step S3), the operation goes to step S4.

In step S4, the spherical aberration probe 3 varies the spherical aberration Y by a degree of ΔY, and the jitter detector 4 measures the jitter. Later in step S5, the spherical aberration probe 3 decides whether the measured jitter value is minimized or not. The operation returns to step S4 so as to vary the spherical aberration Y by using the spherical aberration probe 3 until the jitter value is minimized. When the jitter is minimized (YES in step S5), the operation goes to step S6.

In step S6, the minimum-jitter probe 1 decides whether the jitter minimum value is converged or not, and steps S2–S5 are repeated until the value is converged. The condition for deciding whether the jitter minimum value is converged or not can be, for example, that a change in the jitter minimum value becomes a previously set value or lower than that. The two-dimensional search is ended when the jitter minimum value is converged (YES in step S6).

According to the above-described embodiment of the present invention, the focal position and the spherical aberration of a light beam radiated onto the optical disc 6 are varied so that the minimum jitter probe 1 searches for a focal position and a spherical aberration that minimize the jitter value detected by the jitter detector 4. Accordingly, the jitter value can be optimized on the basis of the spherical aberration of the light beam radiated onto the optical disc 6 as well as the focal position of the light beam radiated onto the optical disc 6. Therefore, an optical information processing apparatus according to the present invention can optimize the quality of a reproduction signal reproduced on the basis of a head signal outputted from the optical head 5.

Though the signal quality index is jitter in a search for the focal position by using the focal position probe 2 and a search for the spherical aberration by using the spherical aberration probe 3 in this embodiment, the present invention is not limited to this example. The signal quality index can be an error rate, amplitude of a reproduction signal, amplitude of a tracking error signal, amplitude of a focusing error signal, amplitude of a wobble signal obtained by scanning a light spot on an information track wobbling due to a predetermined frequency. This can be applied to the following embodiments as well.

The jitter, the error rate and the reproduction signal can be obtained by using an optical head to reproduce a track on which disc information, address and data are recorded. For an unrecorded optical disc, experimental information generated by a recording signal generator 22 (FIG. 1) as a recording-signal generator is recorded on the optical disc 6, and the recorded experimental information is reproduced for obtaining the jitter, the error rate and the reproduction signal.

At this time, recording with a further focused spot can be obtained by recording the experimental information with a spherical aberration that maximizes the amplitude of the focusing error signal in the spherical aberration probe 3 and also at a focal position that maximizes the amplitude of the tracking errors signal in the focal position probe 2. The recorded experimental information can be erased after completing a search for a focal position and a spherical aberration that optimize the value of the signal quality index. Alternatively, an experiment track is provided on the optical disc 6 in order to record experimental information on the experiment track.

Figure 7:
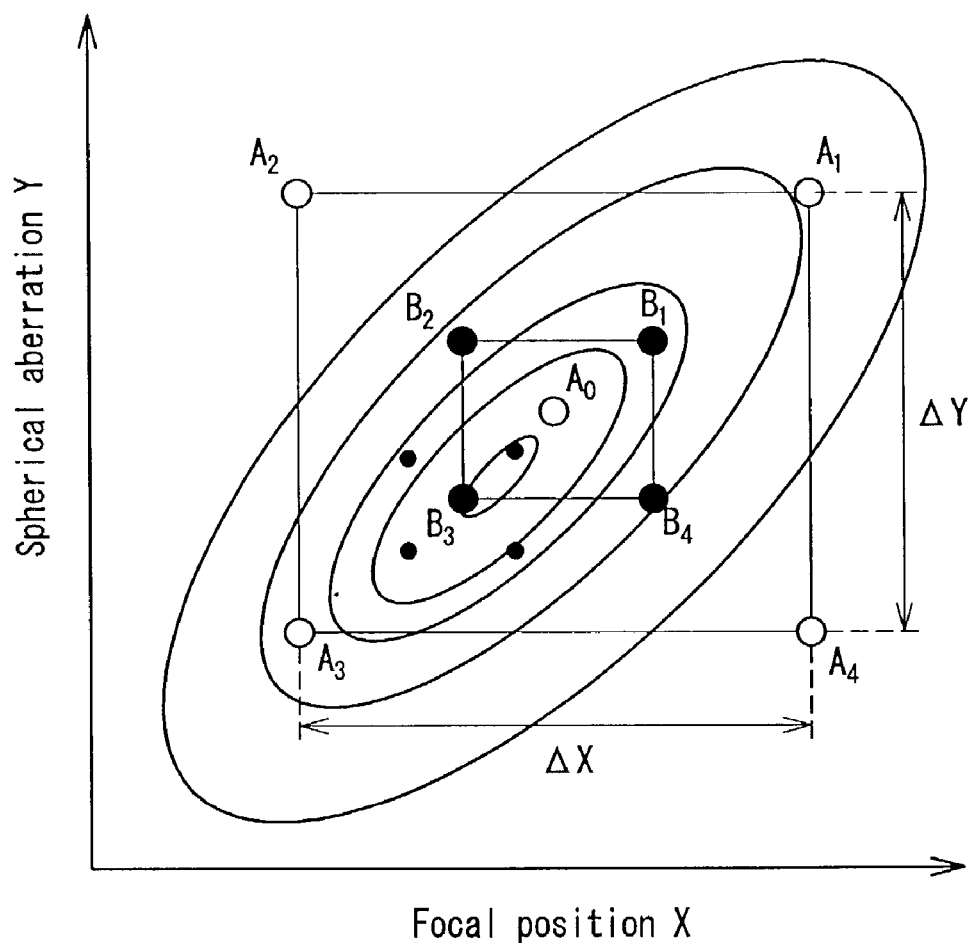
FIG. 7 is a graph for explaining another two-dimensional search using an optical information processing apparatus according to an embodiment of the present invention.

FIG. 7 is a graph for explaining another two-dimensional search by using the optical information processing apparatus 100. Similar to the above-described FIG. 5, the x-axis indicates a focal position and the y-axis indicates a spherical aberration. The jitter value is indicated with a contour map composed of ellipses drawn concentrically.

First, the minimum-jitter probe 1 searches for a point, among the five points of $A_0$, $A_1$, $A_2$, $A_3$ and $A_4$ in FIG. 7, which minimizes the jitter value. For each of the points $A_1$, $A_2$, $A_3$ and $A_4$, one side along the X-axis direction has a length of $\Delta X$, and the points respectively form apiece of a rectangle in which one side along the Y-axis has a length of $\Delta Y$. The point $A_0$ is located at the center of the rectangle composed of the points $A_1$, $A_2$, $A_3$ and $A_4$. In the contour map shown in FIG. 7, the point that minimizes the jitter value searched by the minimum-jitter probe 1 is the point $A_0$.

Next, the minimum-jitter probe 1 searches for a point, among the five points $A_0$, $B_1$, $B_2$, $B_3$ and $B_4$ in FIG. 7, that minimizes the jitter value. The points $B_1$, $B_2$, $B_3$ and $B_4$ form respectively apiece of a rectangle centered on the point $A_0$. In the rectangle formed with the points $B_1$, $B_2$, $B_3$ and $B_4$, one side along with the X-axis direction is shorter than $\Delta X$, and one side along with the Y-axis is shorter than $\Delta Y$. In the contour map shown in FIG. 7, the point that minimizes the jitter value searched by the minimum jitter probe 1 is the point $B_3$.

Subsequently, the above-described search is repeated by centering the point $B_3$ that is obtained in this search as a point minimizing the jitter, and by decreasing further the $\Delta X$ and $\Delta Y$, thereby lowering the jitter value. The repeated search is ended when the jitter value bottoms out and cannot be decreased further. Thereby, a focal position and a spherical aberration that minimize the jitter value can be obtained. This method of search can decrease measurement points of jitter when compared to the method described referring to FIG. 5. Accordingly, the search can be carried out at a higher speed than the method concerning FIG. 5.

Figure 8:
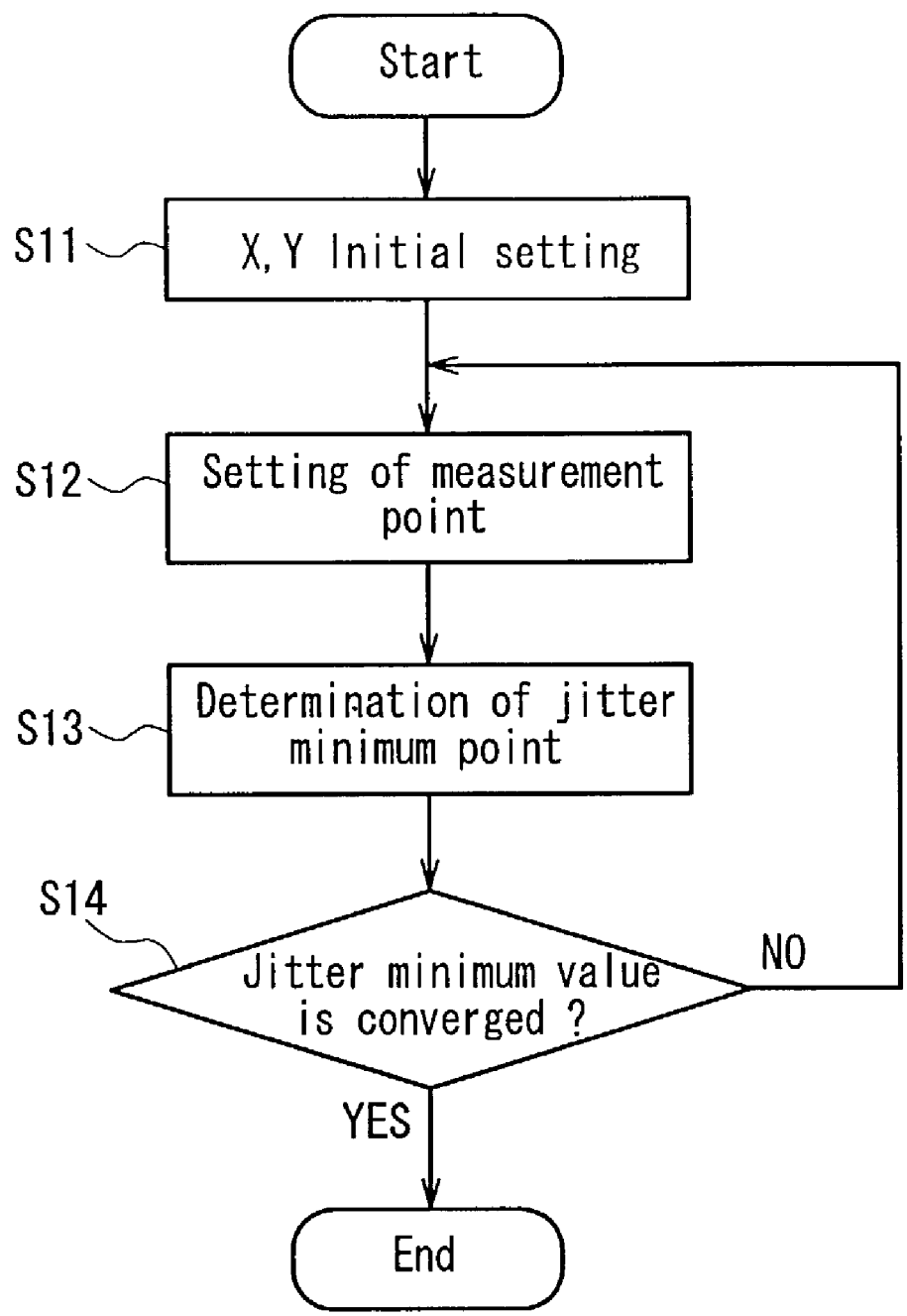
FIG. 8 is a flow chart showing an operation for another two-dimensional search using an optical information processing apparatus according to an embodiment of the present invention.

FIG. 8 is a flow chart showing operations for another two-dimensional search using the optical information processing apparatus 100. First in step S11, the minimum-jitter probe 1 sets initial values for the focal position X and the spherical aberration Y The initial values have a small jitter that is set previously by experiments, simulations or the like to be decreased to a level enabling signal reproduction. In the following step S12, the minimum-jitter probe 1 sets five measurement points included in the ranges of $\Delta X$ and $\Delta Y$ centering the initial value (X, Y). Next in step S13, the jitter detector 4 measures the jitter values at the five measurement points, and the minimum-jitter probe 1 searches for a measurement point, among the five measurement points, which minimizes the jitter.

Later in step S14, the minimum-jitter probe 1 decides whether the jitter minimum value is converged or not. The conditions for decision of convergence can be, for example, that a change of the jitter minimum value becomes equal to or less than a previously-set value, or measurement values of jitter at the five measurement points are equalized.

In a case of a decision that the jitter minimum value is not converged (NO in step S14), steps S12 and S13 are repeated by further decreasing the values of $\Delta X$ and $\Delta Y$. In a case of a decision that the jitter minimum value is converged (YES in step S14), the two-dimensional search is ended. In this manner, a focus control and a spherical aberration control can be performed accurately by performing the two-dimensional search for obtaining a focal position and a spherical aberration that minimize the jitter.

Though the jitter measurement points included in the ranges of $\Delta X$ and $\Delta Y$ are five in this embodiment, the present invention will not be limited thereto. The number of the jitter measurement points can be from 2 to 4, or it can be 6 or more.

As described above, according to the embodiment of the present invention, the minimum-jitter probe 1 searches for a point (Xa, Yb) that minimizes the jitter value by comparing the jitter values at respective points (Xi, Yj), and repeats the search around the point (Xa, Yb) by decreasing the ranges $\Delta X$ and $\Delta Y$. Here, the focal position is defined as a variable X and the spherical aberration is defined as a variable Y, a value of n ('n' is an integer bigger than 1) of the variable X within a range $\Delta X$ is denoted as Xi ('i' is 1 or an integer bigger than 1 and not bigger than n), and a value of m ('m' is an integer bigger than 1) of the variable Y within a range $\Delta Y$ is denoted as Yj ('j' is 1 or an integer bigger than 1 and not bigger than m). Thereby, a focal position and a spherical aberration that minimize the jitter value can be obtained with accuracy.

Figure 9:
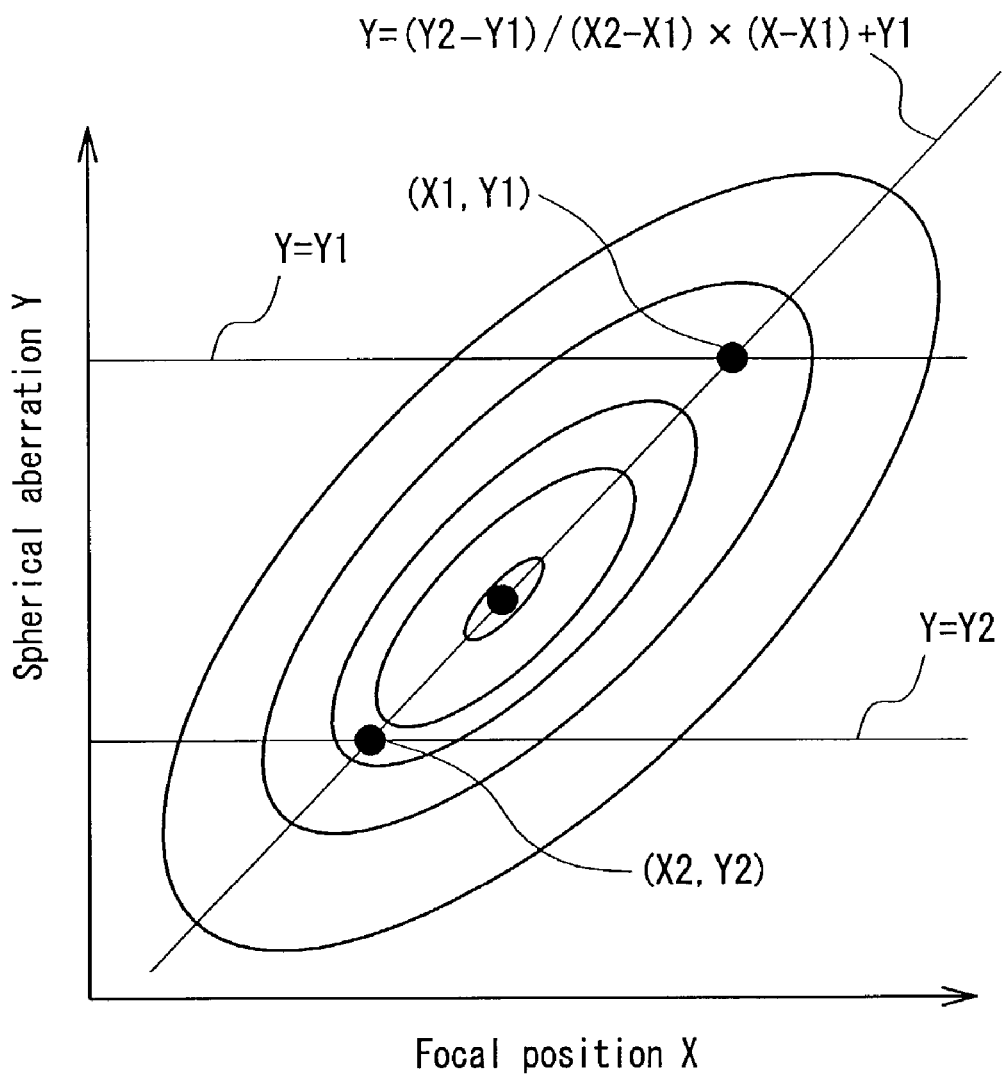
FIG. 9 is a graph for explaining still another two-dimensional search using an optical information processing apparatus according to an embodiment of the present invention.

FIG. 9 is a graph for explaining still another two-dimensional search by using the optical information processing apparatus 100. Similar to the above-identified case concerning FIG. 7, the x-axis indicates a focal position and the y-axis indicates a spherical aberration. The jitter value is indicated with a contour map composed of ellipses drawn concentrically.

First, the minimum-jitter probe 1 varies the focal position X on a straight line of a predetermined spherical aberration Y=Y1 so as to search for a focal position X1 that minimizes the jitter value. Next, the minimum-jitter probe 1 varies the focal position X on another straight line of a predetermined spherical aberration Y=Y2 so as to search for a focal position X2 that minimizes the jitter value.

Next, the minimum-jitter probe 1 varies the focal position X and the spherical aberration Y on a straight line $Y=(Y2-Y2)/(X2-X1)\times(X-X1)+Y1$ that connects the points (X1, Y1) and (X2, Y2) so as to search for a focal position and a spherical aberration that minimize the jitter value. This search method can further decrease the jitter measurement points than the method described referring to FIG. 7. Therefore, the search can be carried out at a still higher speed than the method concerning FIG. 7.

Figure 10:
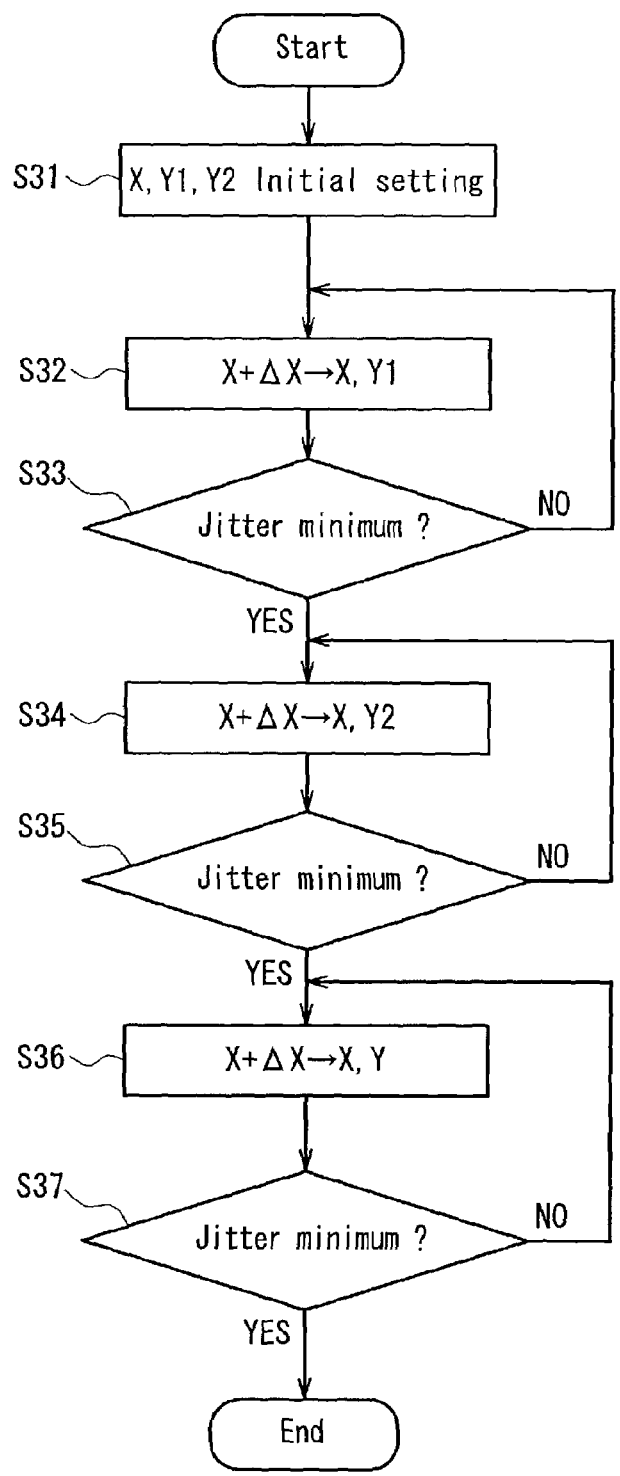
FIG. 10 is a flow chart showing an operation for still another two-dimensional search using an optical information processing apparatus according to an embodiment of the present invention.

FIG. 10 is a flow chart indicating operations for still another two-dimensional search by the optical information processing apparatus 100. First in step S31, initial values regarding the focal position X and the spherical aberrations Y1 and Y2 are set. The initial values have a small jitter that is set previously by experiments, simulations or the like to be decreased to a level enabling signal reproduction. Next in step S32, the jitter is measured by varying the focal position X by a degree of ΔX on a straight line of the spherical aberration Y1. Next in step S33, it is decided whether the measured jitter value is minimum or not. When the measured jitter value is decided as not being minimum (NO in step S33), the operation returns to step S32 for varying the focal position X until the jitter value becomes minimum. When the measured jitter value is decided as minimum (YES in step S33), the operation goes to step S34.

In step S34, the focal position X is varied by a degree of ΔX on a straight line of the spherical aberration Y2 so as to measure the jitter. Next in step S35, the measured jitter value is decided whether it is the minimum or not. When the measured jitter value is decided as not being minimum (NO in the step S35), the operation returns to step S34 for varying the focal position X until the jitter value becomes minimum. When the measure jitter value is decided as minimum (YES in step S35), the operation goes to step S36.

Later in step S36, the focal position X is varied by a degree of ΔX, and the jitter is measured by using the spherical aberration Y as a value obtained by substituting X in a formula representing a straight line connecting a point (X1, Y1) and a point (X2, Y2), that is, $Y=(Y2-Y2)/(X2-X1)\times(X-X1)+Y1$. In step S37, it is decided whether the measured jitter value becomes minimum or not. When the measure jitter value is decided as not being minimum (NO in the step S37), the operation returns to step S36 for varying the focal position X and the spherical aberration Y until the jitter value becomes minimum. When the measured jitter value is decided as minimum (YES in step S37), the two-dimensional search is ended.

According to this embodiment of the present invention, when the focal position is defined as a variable X and the spherical aberration is defined as a variable Y, the minimum-jitter probe 1 varies the focal position X for a predetermined spherical aberration Y1 so as to search for a focal position X1 that minimizes the jitter value, and varies the focal position X for a predetermined spherical aberration Y2 so as to search for a focal position X2 that minimizes the jitter value, and thus it varies the focal position X and the spherical aberration Y on a straight line $Y=(Y2-Y1)/(X2-X1)\times(X-X1)+Y1$ connecting a point (X1, Y1) and a point (X2, Y2) so as to search for a focal position and a spherical aberration that minimize the jitter value. Thereby, a focal position and a spherical aberration that minimize the jitter value can be obtained accurately at a high speed.

Here, the focal position X is searched under a condition of predetermined spherical aberrations Y=Y1 and Y=Y2. Needless to say, a similar search can be performed by searching for the spherical aberration Y under a condition of predetermined focal positions X=X1 and X=X2.

Figure 11:
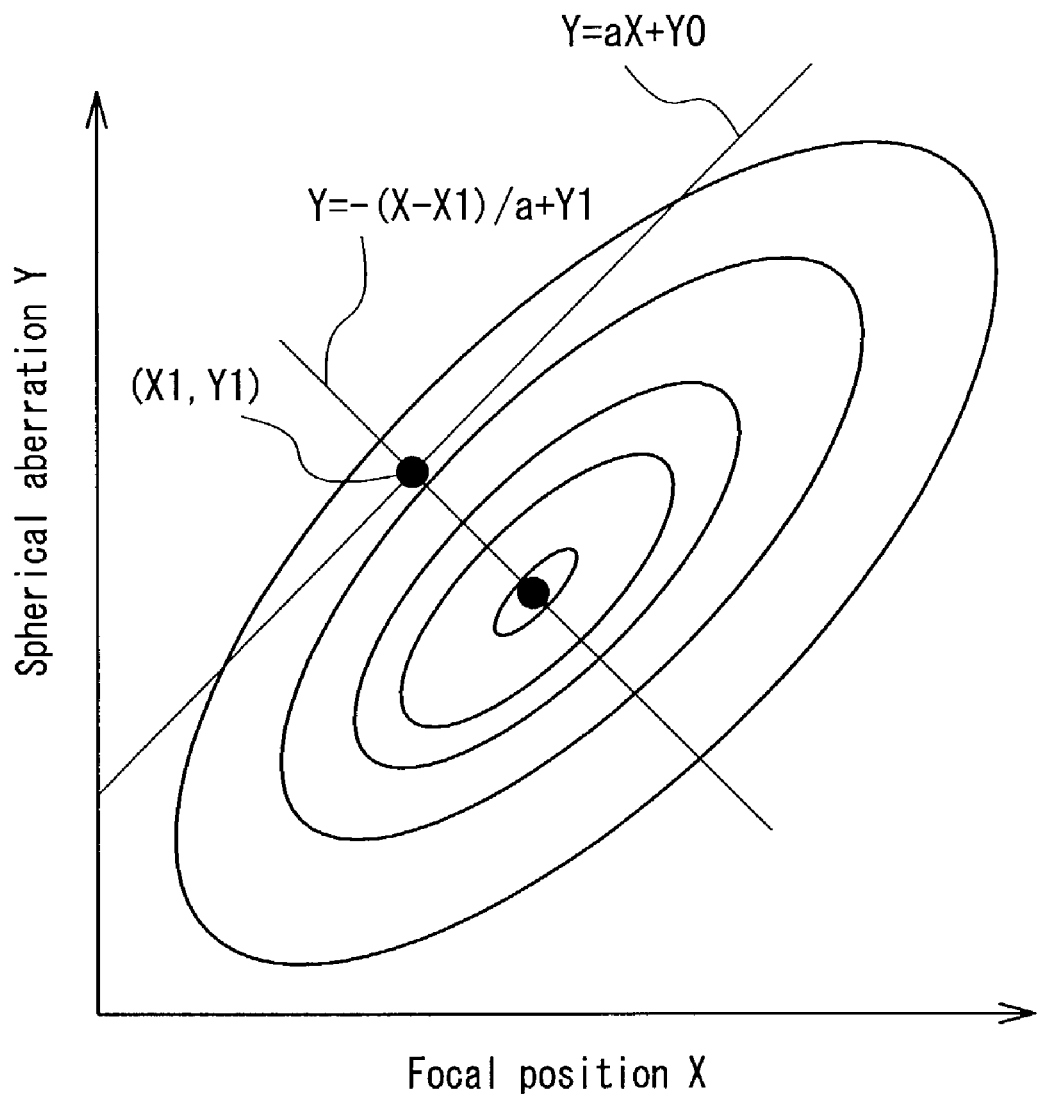
FIG. 11 is a graph for explaining a still another two-dimensional search using an optical information processing apparatus according to an embodiment of the present invention.

FIG. 11 is a graph for explaining still another two-dimensional search by using the optical information processing apparatus 100. First, the minimum-jitter probe 1 varies the focal position X and the spherical aberration Y on a straight line $Y=aX+Y0$ concerning a tilt a passing a predetermined spherical aberration Y0 so as to search for a focal position X1 and a spherical aberration Y1 that minimize the jitter value. Next, the minimum-jitter probe 1 varies the focal position X and the spherical aberration Y on a straight line $Y=-(X-X1)/a+Y1$ concerning a tilt $-1/a$ passing a point (X1, Y1) so as to search for a focal position and a spherical aberration that minimize the jitter value.

The tilt a is determined corresponding to the numerical aperture, the wavelength, and the recording method. When the tilt a is set as a value that is 0.1 λrms/μm or more and 0.3 λrms/μm or less (λ denotes a wavelength of light), it is effective for use in an optical head having a numerical number NA of 0.85 and used for irradiating an optical disc with light having a wavelength that is 390 nm or more and 420 nm or less.

The search method utilizes that the major axes and the minor axes composing the contour map representing a jitter characteristic have respectively certain tilts with respect to the x-axis and the y-axis. This can decrease further jitter measurement points in a comparison with the method described above referring to FIG. 9. Therefore, the search can be carried out at a higher speed than the method concerning FIG. 9.

Figure 12:
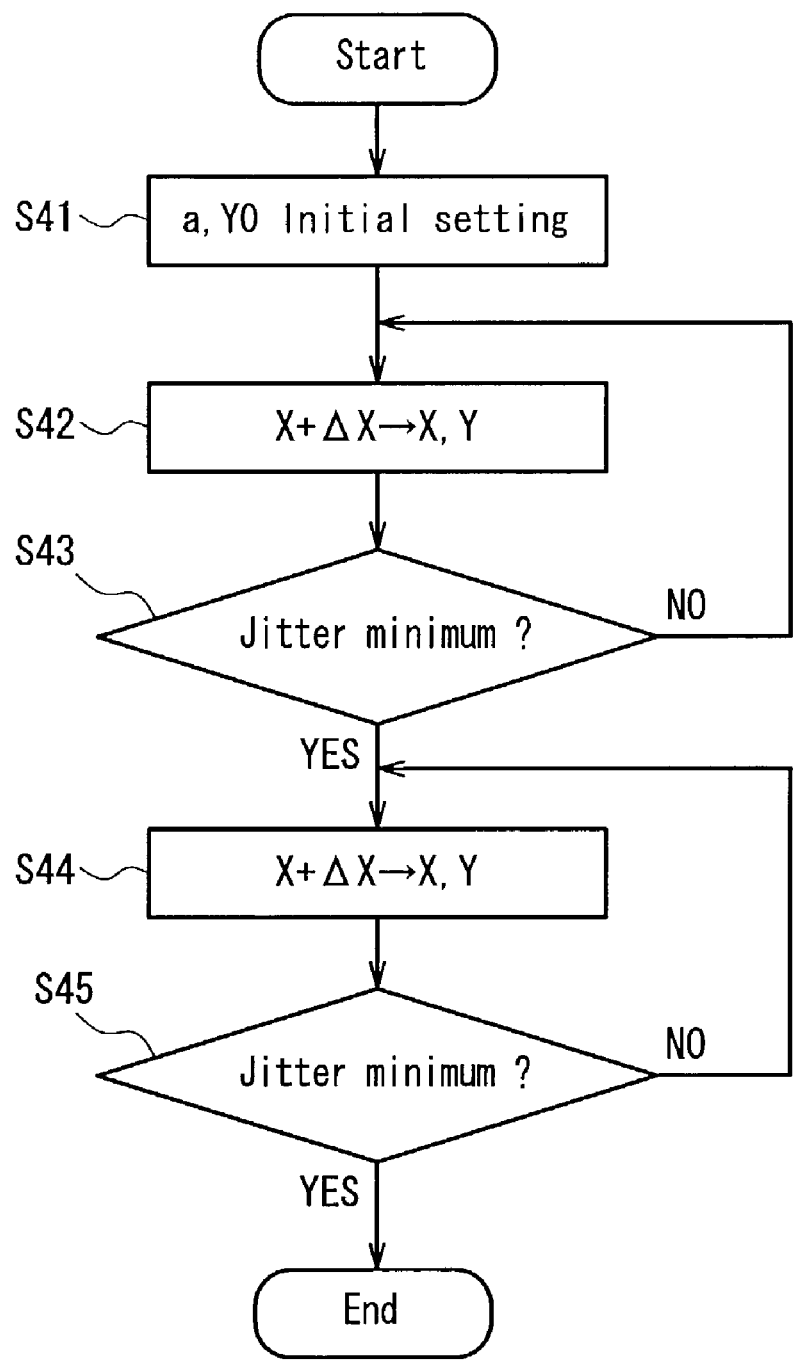
FIG. 12 is a flow chart showing an operation for a still another two-dimensional search using an optical information processing apparatus according to an embodiment of the present invention.

FIG. 12 is a flow chart showing operations for a still another two-dimensional search by using the optical information processing apparatus 100. First in step S41, initial values for a tilt a and a spherical aberration Y0 are set. The initial values have a small jitter that is set previously by experiments, simulations or the like to be decreased to a level enabling signal reproduction. In step S42, the focal position X is varied by a degree of ΔX and the spherical aberration Y is determined as a value obtained by substituting X into a formula $Y=aX+Y0$, and thus the jitter is measured.

Next in step S43, it is decided whether the measured jitter value is minimum or not. When the measured jitter value is decided as not being minimum (NO in step S43), the operation returns to step S42 so as to vary the focal position X and the spherical aberration Y until the jitter value becomes minimum. When the measured jitter value is decided as minimum (YES in step S43), the operation goes to step S44.

In step S44, the focal position X is varied by a degree of ΔX and the spherical aberration Y is determined as a value obtained by substituting X into a formula $Y=-(X-X1)/a+Y1$ so as to measure the jitter. Next in step S45, the measured jitter value is evaluated as to whether it is the minimum or not. When the measured jitter value is decided as not being minimum (NO in the step S45), the operation returns to step S44 for varying the focal position X and the spherical aberration Y until the jitter value becomes minimum. When the measure jitter value is decided as minimum (YES in step S45), the two-dimensional search is ended.

According to this embodiment of the present invention, when the focal position is defined as a variable X and the spherical aberration is defined as a variable Y, the minimum-jitter probe 1 varies the focal position X and spherical aberration Y on a straight line $Y=aX+Y0$ concerning a tilt a passing a predetermined spherical aberration Y0 so as to search for a focal position X1 and a spherical aberration Y1 that optimize the jitter value, and varies the focal position X and a spherical aberration Y on a straight line $Y=-(X-X1)/a+Y1$ concerning a tilt $-1/a$ passing a point (X1, Y1) so as to search for a focal position and a spherical aberration that minimize the jitter value. Thereby, a focal position and a spherical aberration that minimize the jitter value can be obtained accurately at a high speed.

Though the spherical aberration is compensated by varying the spacing between two lenses provided in the spherical aberration compensator 7 of an optical head 5 in the above-described embodiment, the present invention is not limited thereto. Alternatively, the spherical aberration can be compensated by using a liquid crystal element.

Figure 13:
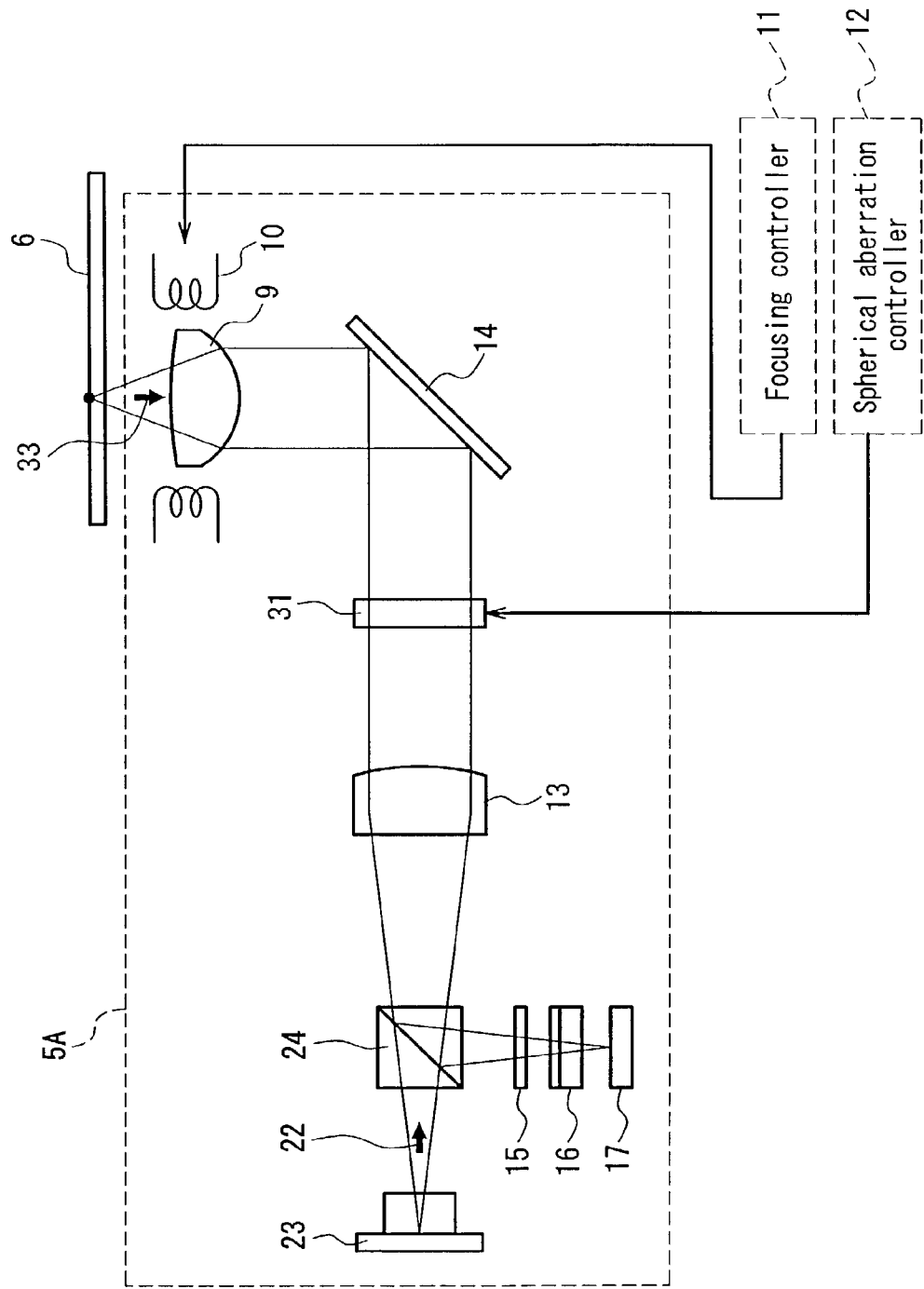
FIG. 13 is a block diagram for explaining a configuration of another optical head provided in an optical information processing apparatus according to an embodiment of the present invention.
Figure 14:
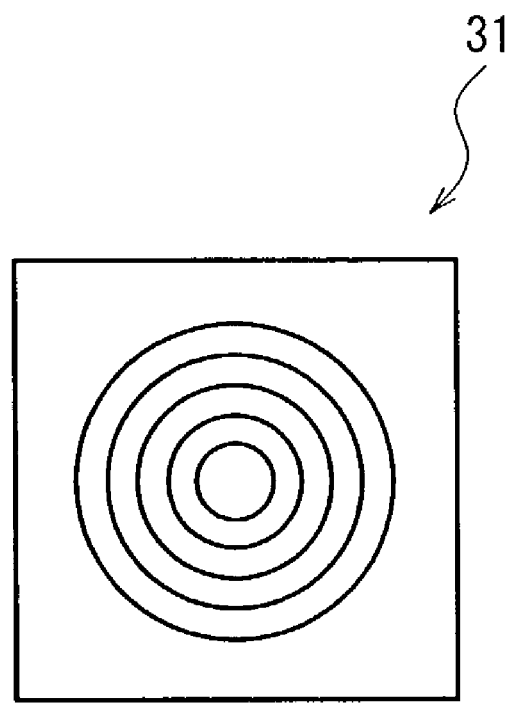
FIG. 14 is a front view of a liquid crystal element provided in another optical head according to an embodiment of the present invention.
Figure 15:
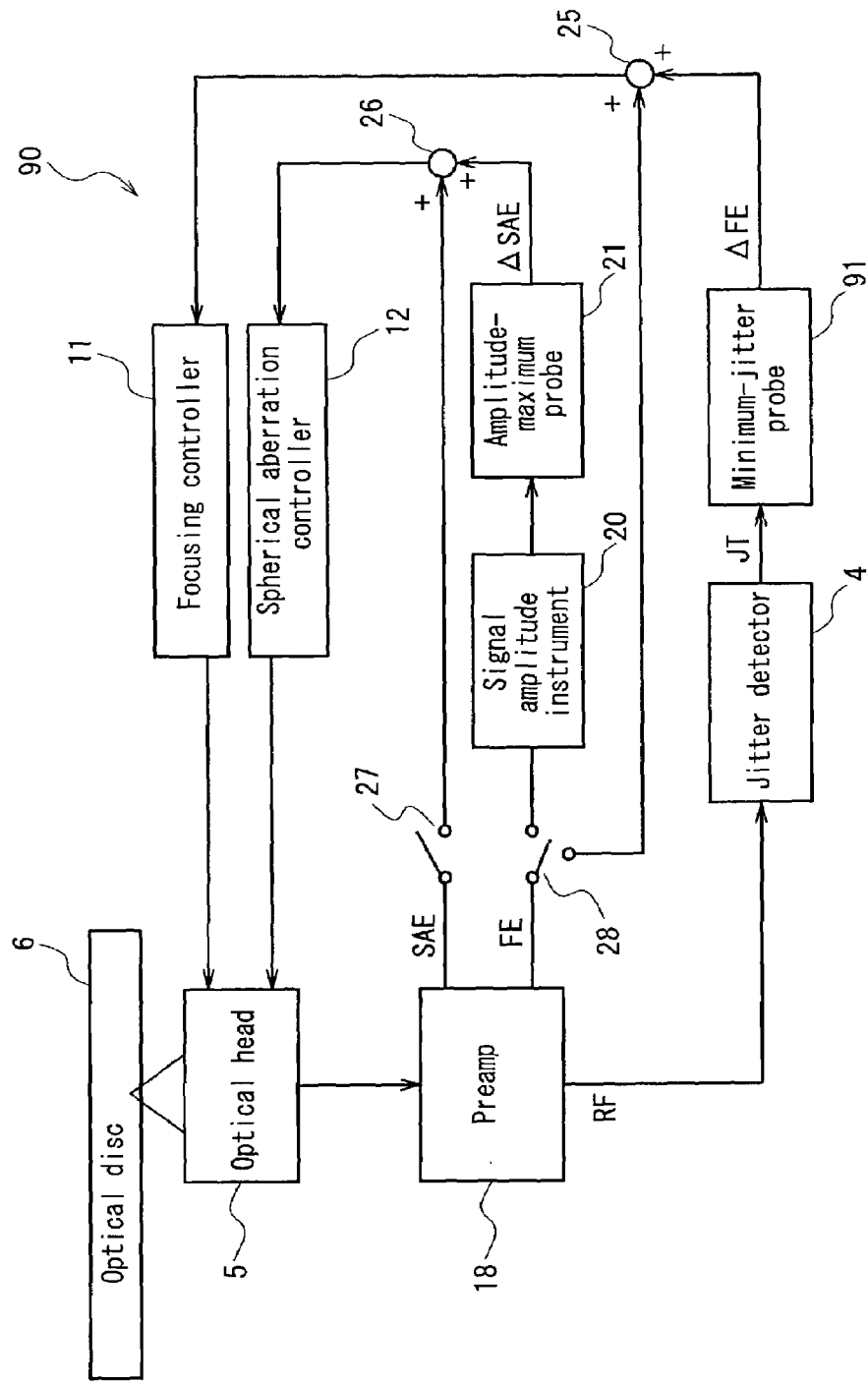
FIG. 15 is a block diagram showing a configuration of a conventional optical information processing apparatus.
Figure 16:
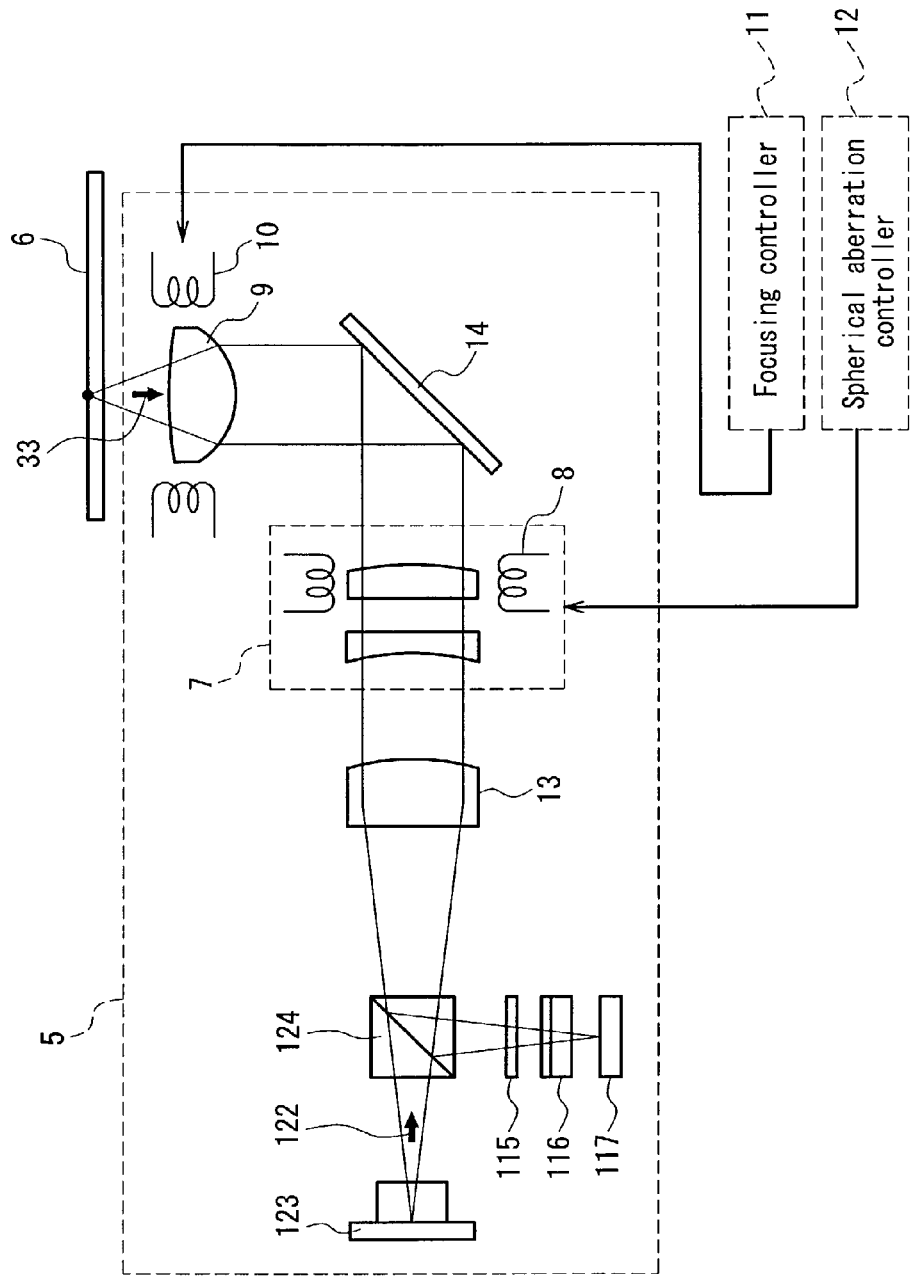
FIG. 16 is a block diagram for explaining a configuration of an optical head provided in a conventional optical information processing apparatus.
Figure 17A:
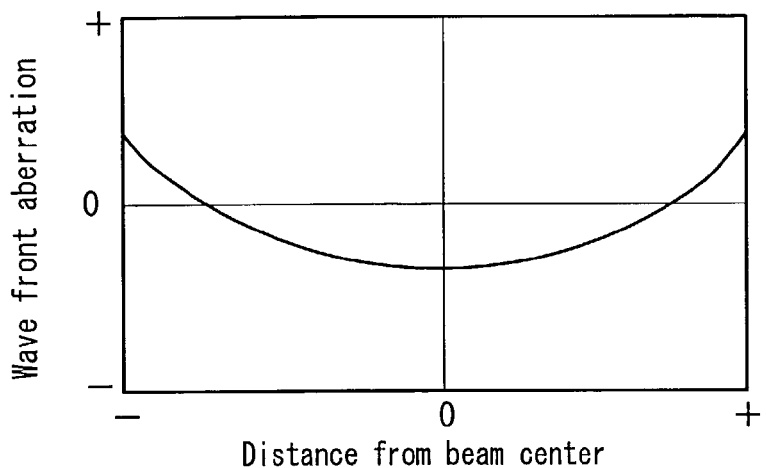
FIGS. 17A–17C are graphs showing a relationship between a wave front aberration and a distance from a center of a light beam.
Figure 17B:
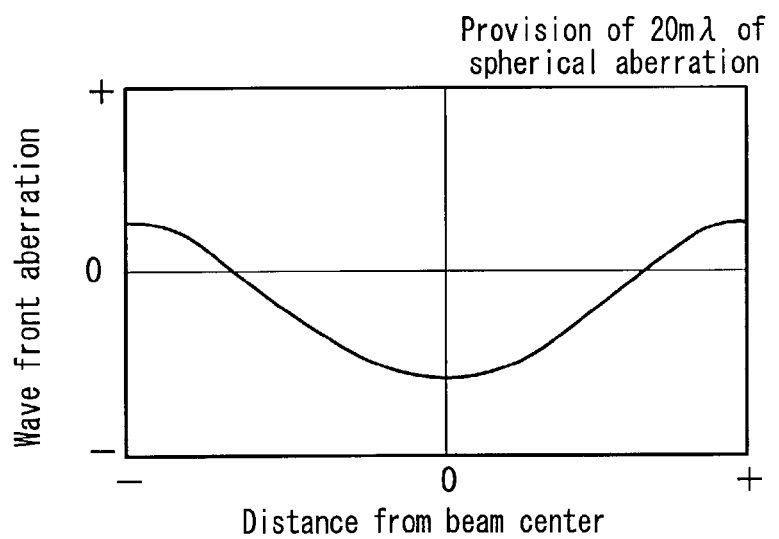
Figure 17C:
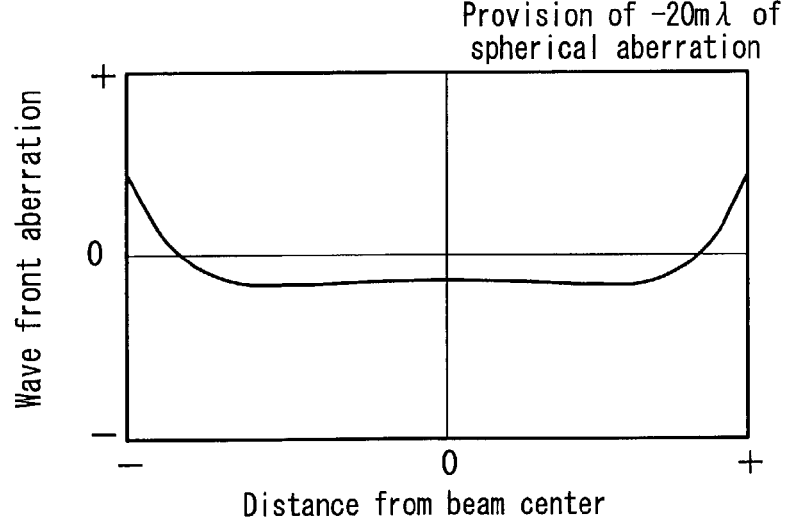

FIG. 13 is a block diagram for explaining a configuration of another optical head 5A provided in the optical information processing apparatus 100 according to an embodiment of the present invention. FIG. 14 is a front view of a liquid crystal element 31 provided in the optical head 5A. Identical reference signs are used for components common to those of the optical head 5 described above by referring to FIG. 2. Therefore, detailed explanation will be omitted for these components. The optical head 5A is different from the above-described optical head 5 in that the spherical aberration compensator 7 is replaced by the liquid crystal element 31. As shown in FIG. 14, an electrode provided in the liquid crystal element 31 is divided into plural regions by concentric circles. The phase differences of light transmitted through the liquid crystal element 31 are controlled by adjusting voltages applied respectively to the electrodes provided in the respective regions, thereby compensating the spherical aberration.

Accordingly, the present invention can provide an optical information processing apparatus that improves a signal reproduced from an optical disc, and the present invention can provide a method of processing optical information.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, all changes that come within the meaning and range of equivalency of the claims are intended to be embraced therein.

What is claimed is:

1. An optical information processing apparatus comprising:
    an optical head for irradiating an optical information recording medium with light, convening the light into a head signal after the light is reflected by the optical information recording medium, and outputting the head signal,
    a signal quality index detector for detecting a signal quality index representing quality of the head signal on the basis of the head signal outputted from the optical head, and
    a two-dimensional probe for varying a focal position and a spherical aberration of the light radiated onto the optical infonnation recording medium so as to search for a focal position and a spherical aberration that optimize the signal quality index detected by the signal quality index detector,
    wherein the two-dimensional probe comprises:
    a focal position probe for varying the focal position so as to search for a focal position that optimizes the signal quality index, and
    a spherical aberration probe for varying the spherical aberration so as to search for a spherical aberration that optimizes the signal quality index, and
    wherein, first, the focal position probe searches for the focal position that optimizes the signal quality index, and then, the spherical aberration probe searches for the spherical aberration that optimizes the signal quality index,
    wherein the optical head irradiates the optical information recording medium with light so as to record experimental information, and the head signal convened from the light reflected by the optical information recording medium is obtained by reproducing the experimental information, and
    wherein the signal quality index comprises a focusing error signal and a tracking error signal;
    the two-dimensional probe has a focal position probe for varying the focal position so as to search for a focal position that maximizes the amplitude of the tracking error signal, and a spherical aberration probe for varying the spherical aberration so as to search for a spherical aberration tat maximizes the amplitude of the focusing error signal; and
    the optical head records more experimental information on the optical information recording medium at the searched spherical aberration that maximizes the amplitude of the focusing error signal and at the searched focal position that maximizes the amplitude of the tracking error signal.

2. A method of processing optical information, comprising:
    an optical head signal output comprising irradiating an optical information recording medium with light, converting the light into a head signal after the light is reflected by the optical information recording medium, and outputting the head signal,
    a signal quality index detection comprising detecting a signal quality index representing quality of the head signal on the basis of the head signal outputted from the optical head, and
    a two-dimensional search comprising varying the focal position and the spherical aberration of the light radiated onto the optical information recording medium so as to search for a focal position and a spherical aberration that optimize the signal quality index detected by the signal quality index detector,
    wherein, in the two-dimensional search, first, the focal position that optimizes the signal quality index is searched, and then, the spherical aberration that optimizes the signal quality index is searched,
    wherein experimental information is recorded on the optical information recording medium, and the head signal converted from the light reflected by the optical information recording medium is obtained by reproducing the experimental information.
    wherein the signal quality index comprises a focusing error signal and a tracking error signal;
    the two-dimensional search comprises a focal position search comprising varying the focal position so as to search for a focal position that maximizes the amplitude of the tracking error signal, and a spherical aberration search comprising varying the spherical aberration so as to search for a spherical aberration that maximizes the amplitude of the focusing error signal; and
    more experimental information is recorded on the optical information recording medium in advance of the optical head signal output, at the searched spherical aberration that maximizes the amplitude of the focusing error signal and at the searched focal position that maximizes the amplitude of the tracking error signal.

* * * * *

UNITED STATES PATENT AND TRADEMARK OFFICE
CERTIFICATE OF CORRECTION

PATENT NO. : 7,277,365 B2
APPLICATION NO. : 10/289685
DATED : October 2, 2007
INVENTOR(S) : Yasuda et al.

It is certified that error appears in the above-identified patent and that said Letters Patent is hereby corrected as shown below:

Column 17, line 47: "optical infonnation" should read --optical information--.
Column 18, line 12: "tat maximizes the amplitude" should read --that maximizes the amplitude--.

Signed and Sealed this

Eleventh Day of November, 2008

JON W. DUDAS
*Director of the United States Patent and Trademark Office*